United States Patent
Yamaguchi et al.

(10) Patent No.: US 6,341,104 B1
(45) Date of Patent: Jan. 22, 2002

(54) OPTICAL PICKUP APPARATUS OF TILT CONTROL TYPE

(75) Inventors: Hideo Yamaguchi; Tadashi Maki; Junya Aso, all of Fukuoka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/362,370

(22) Filed: Jul. 28, 1999

(30) Foreign Application Priority Data

Aug. 3, 1998 (JP) .......................................... 10-218804
Aug. 3, 1998 (JP) .......................................... 10-218805

(51) Int. Cl.$^7$ ................................................. G11B 7/00
(52) U.S. Cl. ............................... 369/44.15; 369/44.14; 369/44.16; 359/814; 359/812
(58) Field of Search ........................... 369/44.14, 44.15, 369/44.16, 44.21, 44.22; 359/813, 814, 823, 824

(56) References Cited

U.S. PATENT DOCUMENTS

| | | | | |
|---|---|---|---|---|
| 5,446,721 A | * | 8/1995 | Sekimoto et al. | 369/44.15 |
| 5,598,397 A | * | 1/1997 | Sim | 369/44.21 |
| 5,877,904 A | * | 3/1999 | Kawano et al. | 369/44.15 |
| 5,905,255 A | * | 5/1999 | Wakabayashi et al. | 369/44.22 |
| 5,926,327 A | * | 7/1999 | Bae | 369/44.15 |
| 5,940,227 A | * | 8/1999 | Haraguchi et al. | 369/44.15 |
| 5,999,501 A | * | 12/1999 | Tomita et al. | 369/44.15 |
| 6,163,416 A | * | 12/2000 | Uekusa et al. | 369/44.15 |

FOREIGN PATENT DOCUMENTS

| | | |
|---|---|---|
| JP | 8106641 | 4/1996 |
| JP | 10320804 | 12/1998 |

* cited by examiner

Primary Examiner—Thang V. Tran
(74) Attorney, Agent, or Firm—Stevens, Davis, Miller & Mosher, LLP

(57) ABSTRACT

An optical pickup apparatus suited for reducing the size and thickness and capable of performing a tilt control of an objective lens with ease, and an optical disk apparatus. The optical pickup apparatus comprises: an objective lens for focusing a beam emitted from a light source onto an optical disk; a lens holding cylinder for holding the objective lens; wires and elastic tilt members for elastically supporting the lens holding cylinder so that it can be moved; and a yoke base for fixedly supporting the wires and for fixedly supporting magnets, the magnets being adapted to movably drive the lens holding cylinder; wherein the lens holding cylinder has a circular space portion and an almost rectangular opening portion in which the magnets are inserted, the circular space portion being adapted to hold the objective lens and guide the beam emitted from the light source to the objective lens; wherein the wires have one end thereof secured to a suspension holder and the elastic tilt members have one end thereof secured to a nearly central part, with respect to a tangential direction, of the almost rectangular opening portion of the lens holding means; wherein the lens holding cylinder is supported so that it can be pivoted in the tangential direction about the elastic tilt member as a rotating center.

30 Claims, 18 Drawing Sheets

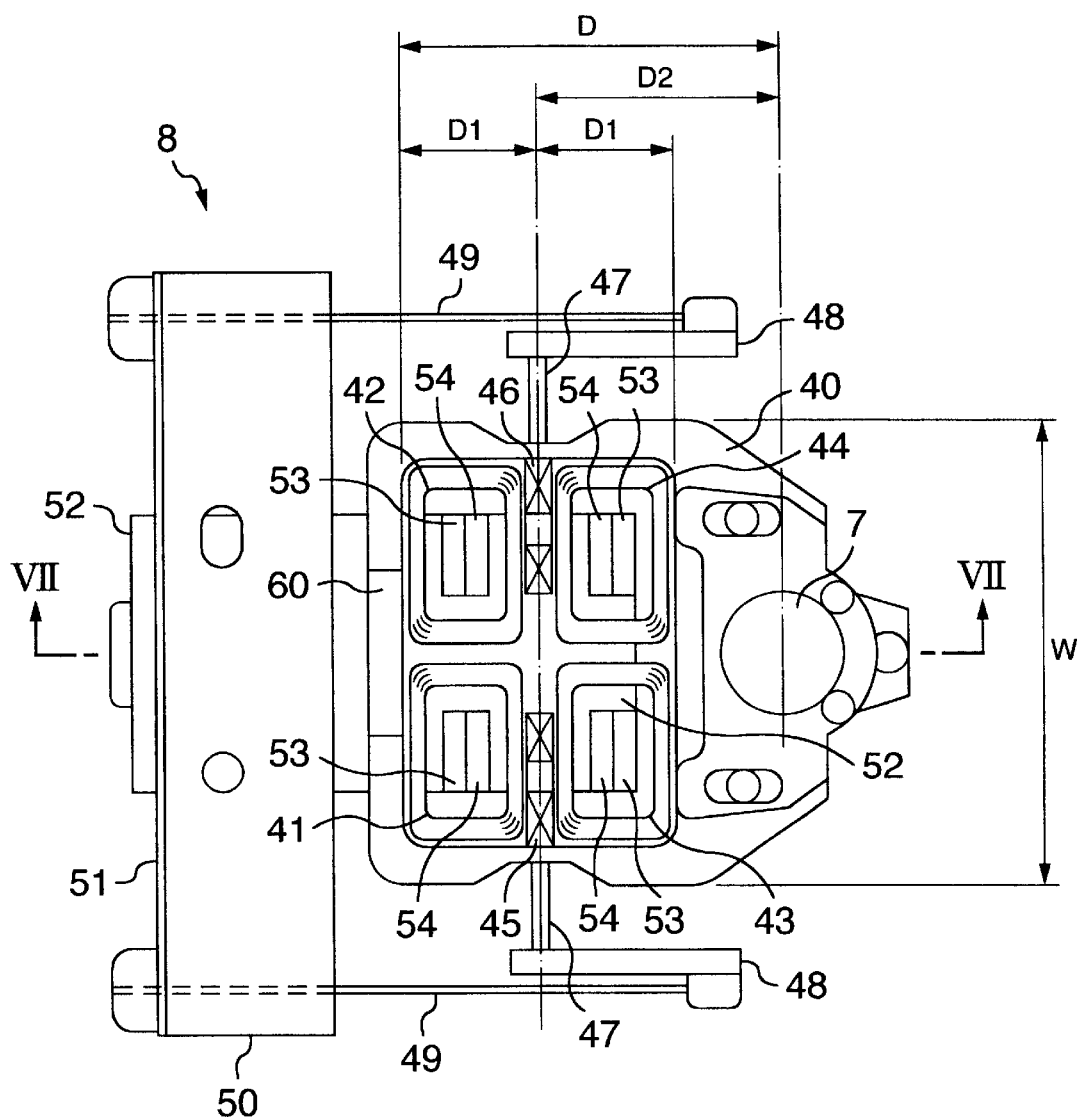

FIG. 8
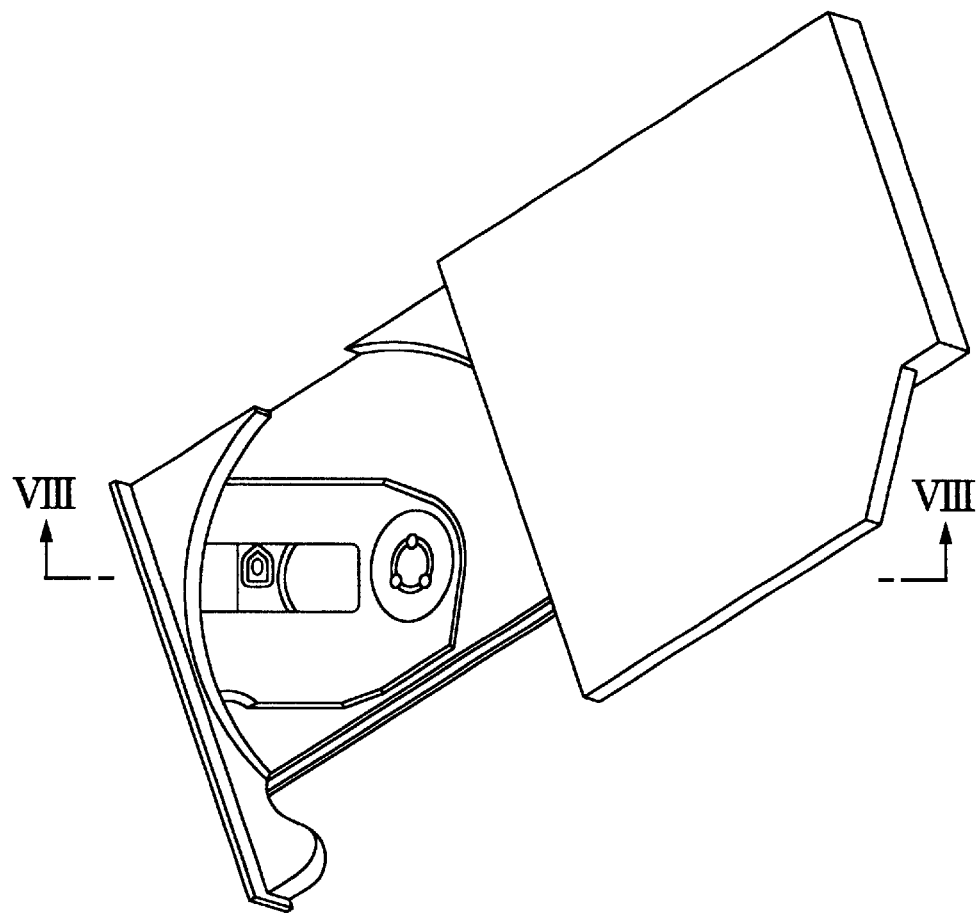
CROSS SECTION TAKEN ALONG THE LINE VIII-VIII
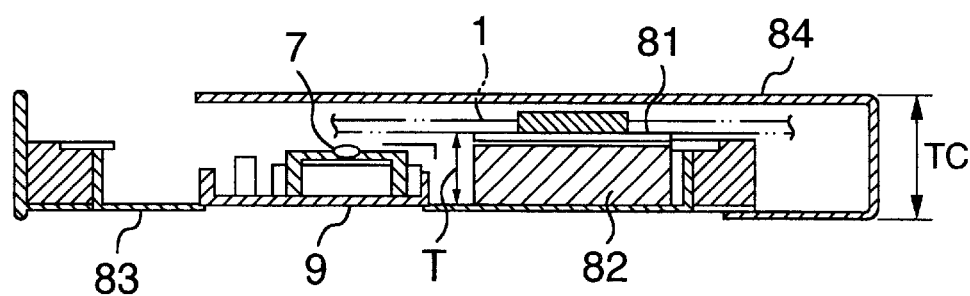

RADIAL DIRECTION

TANGENTIAL DIRECTION

D

FIG. 16
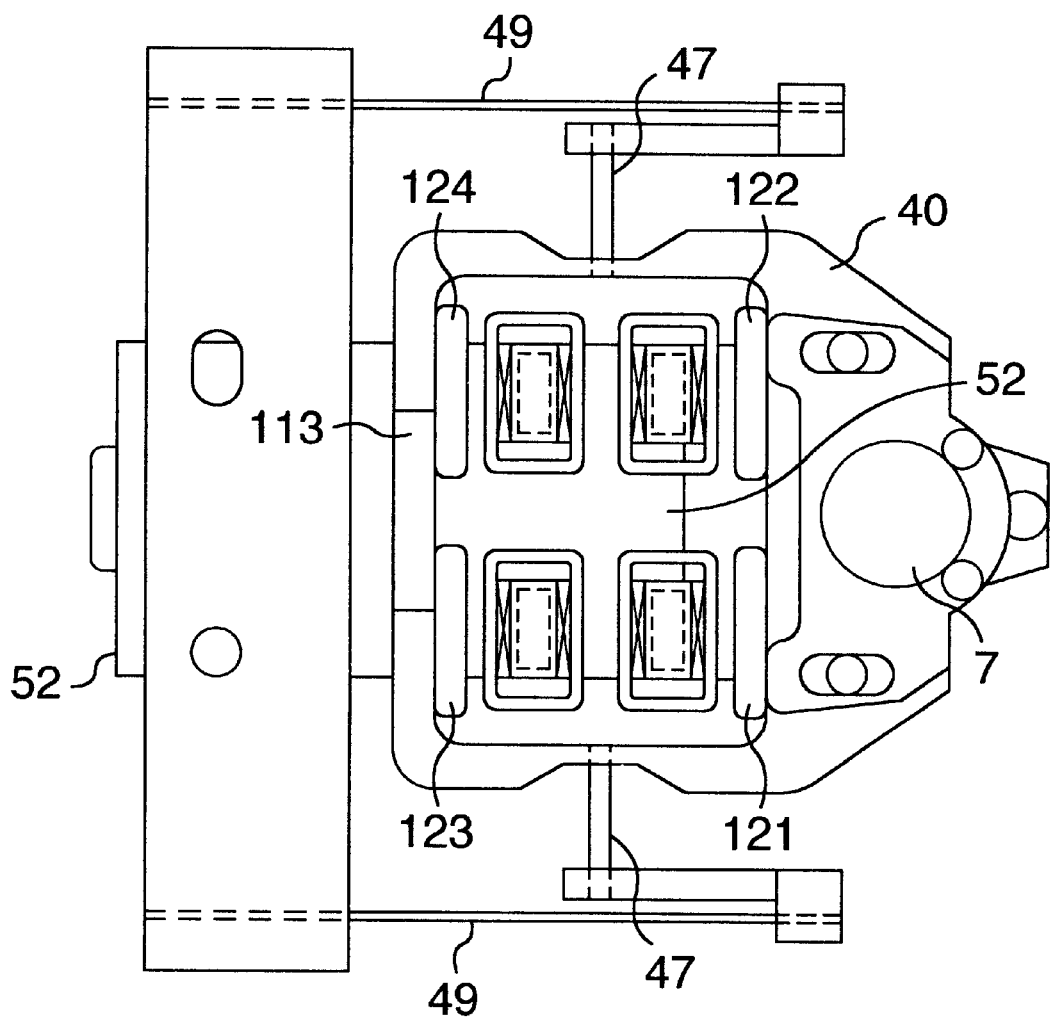
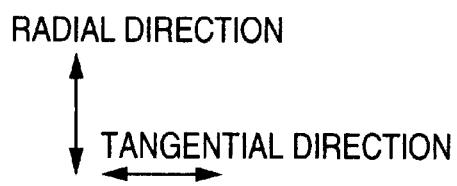

OPTICAL PICKUP APPARATUS OF TILT CONTROL TYPE

BACKGROUND OF THE INVENTION

1. Field of the Invention

The present invention relates to an optical pickup apparatus used to record and replay an optical disk, such as high-density disk and compact disk, and also to an optical disk apparatus using the optical pickup apparatus.

2. Description of the Related Art

The optical disks, because of their advantages of easy handling and large storage capacity, have found very wide use. With a growing use occasions have come to be reported where the optical disk surface is "warped" because the disk is made of a poor-quality material or after it has been used a large number of times. To fully exploit the advantages of the optical disk, it is required that the optical pickup throw a beam perpendicular to the optical disk. The "warped" optical disk, however, cannot meet this requirement and fails to perform correct reproduction.

Conventional measures taken to cope with this problem involve changing the position of a shaft that supports and guides an optical pickup 3 to counteract the "warping," or tilting a spindle motor unit 2 that rotates the optical disk. Because the "warping" is not uniform, however, these measures are not suited for all disks.

Another method has been proposed which tilts the optical pickup following the optical disk. This is an optical pickup of a type that arranges a coil and a magnet around an objective lens to tilt the objective, as disclosed in Japanese Patent Laid-Open No. 8-106641 for example. These optical pickups, however, are generally arranged to be supported by a plurality of elastic members and thus cannot perform a tilt control (displacement in a tangential direction described later) which extends one group of elastic members and compresses another group of elastic members.

As the computers using the optical disk as an external storage medium are becoming smaller in size and weight and there is a growing need that the computer can be carried and used whenever and wherever the user wishes to use it. Thus, there is an increasing demand also on the optical disk for reduced size, weight and thickness. With the above invention, however, because the coil and magnet are arranged around the objective lens, a block including the objective lens becomes large, blocking the way to a further reduction in the size and thickness of the optical pickup apparatus.

The present invention has been accomplished to solve the above-described problems and its object is to provide an optical pickup apparatus which enables an easy tilt control of the objective lens and which is suited for reduction in size and thickness and to provide an optical disk apparatus using such an optical pickup apparatus.

SUMMARY OF THE INVENTION

An optical pickup apparatus according to the present invention comprises: an objective lens for focusing a beam emitted from a light source onto an optical disk; a lens holding means for holding the objective lens; a plurality of elastic supporting means for elastically supporting the lens holding means so that it can be moved; and a support base means for fixedly supporting the elastic supporting means and for fixedly supporting a drive means, the drive means being adapted to movably drive the lens holding means; wherein the lens holding means has a circular space portion and an almost rectangular opening portion in which the drive means is inserted, the circular space portion being adapted to hold the objective lens and guide the beam emitted from the light source to the objective lens; wherein the elastic supporting means has a first elastic supporting means having one end thereof secured to the support base means and a second supporting means having one end thereof secured to an almost central part, with respect to a tangential direction, of the almost rectangular opening portion of the lens holding means; wherein the lens holding means is supported so that it can be pivoted in the tangential direction about the second elastic supporting means as a rotating center.

With this construction, the optical pickup apparatus can perform the tilt control in both the radial and tangential directions. Thus, it can correct radial and tangential skews caused, for example, by an optical disk warping. Further, it is possible to increase a skew margin by the tilt control, thereby assuring reliable reproduction and recording even for high-density optical disks and low-precision optical disks. Further, the space utilization of the tilt control mechanism can be improved to realize a small and thin optical pickup apparatus. The use of this optical pickup apparatus can reduce the size and thickness of the optical disk apparatus.

BRIEF DESCRIPTION OF THE DRAWINGS

FIG. 5 is a plan view of an actuator unit of FIG. 3.

FIG. 8 is a perspective view of an optical disk apparatus using the optical pickup apparatus of the resent invention and also a cross section taken along the line VIII—VIII of the perspective view.

FIG. 16 is a plan view of another actuator unit in FIG. 12.

DESCRIPTION OF THE PREFERRED EMBODIMENTS

Embodiment 1 general construction

Figure 1:
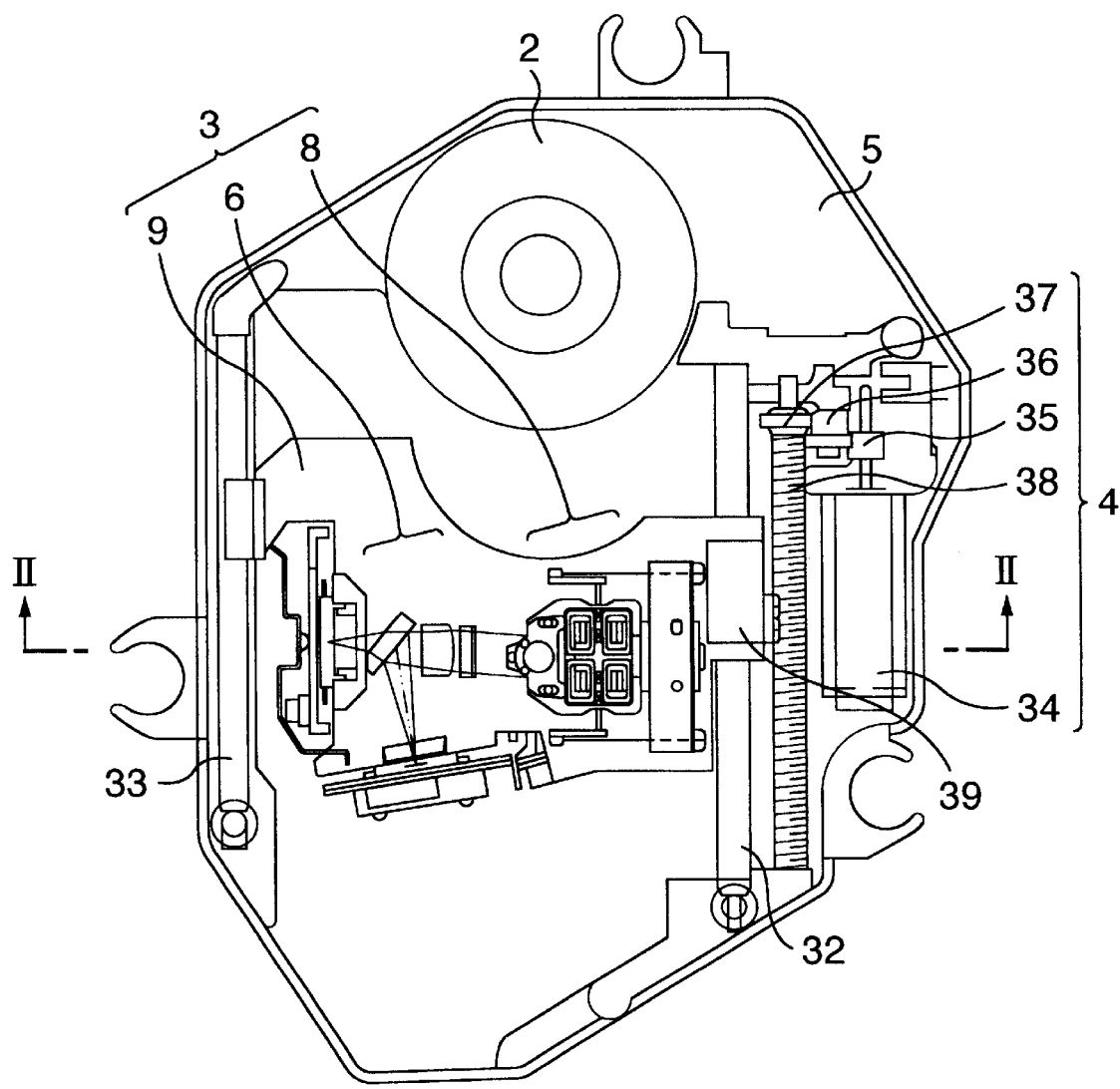
FIG. 1 is a plan view of an optical pickup apparatus according to one embodiment of the present invention.
Figure 2:
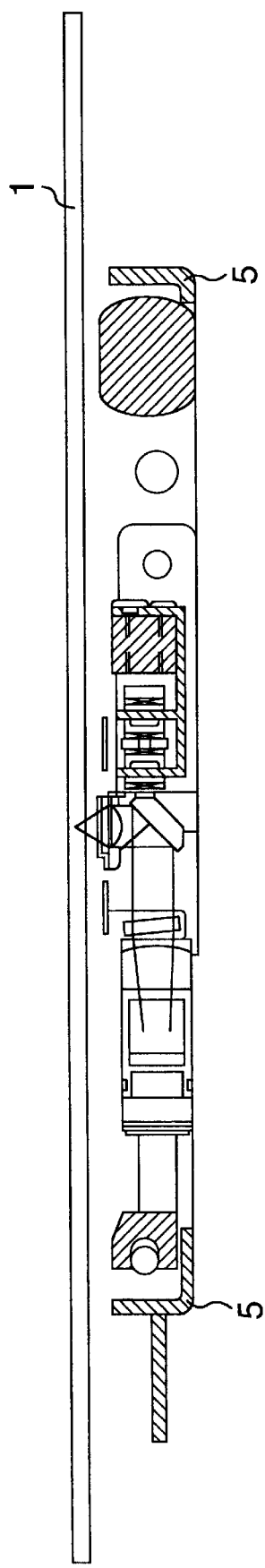
FIG. 2 is a across section taken along the line II—II of FIG. 1.
Figure 4:
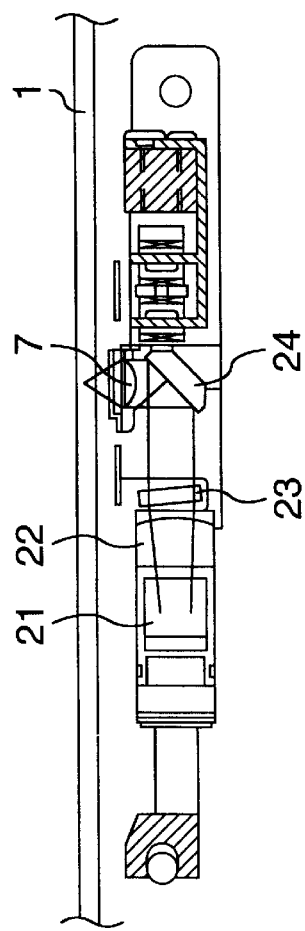
FIG. 4 is a cross section taken along the line IV—IV of FIG. 3.
Figure 3:
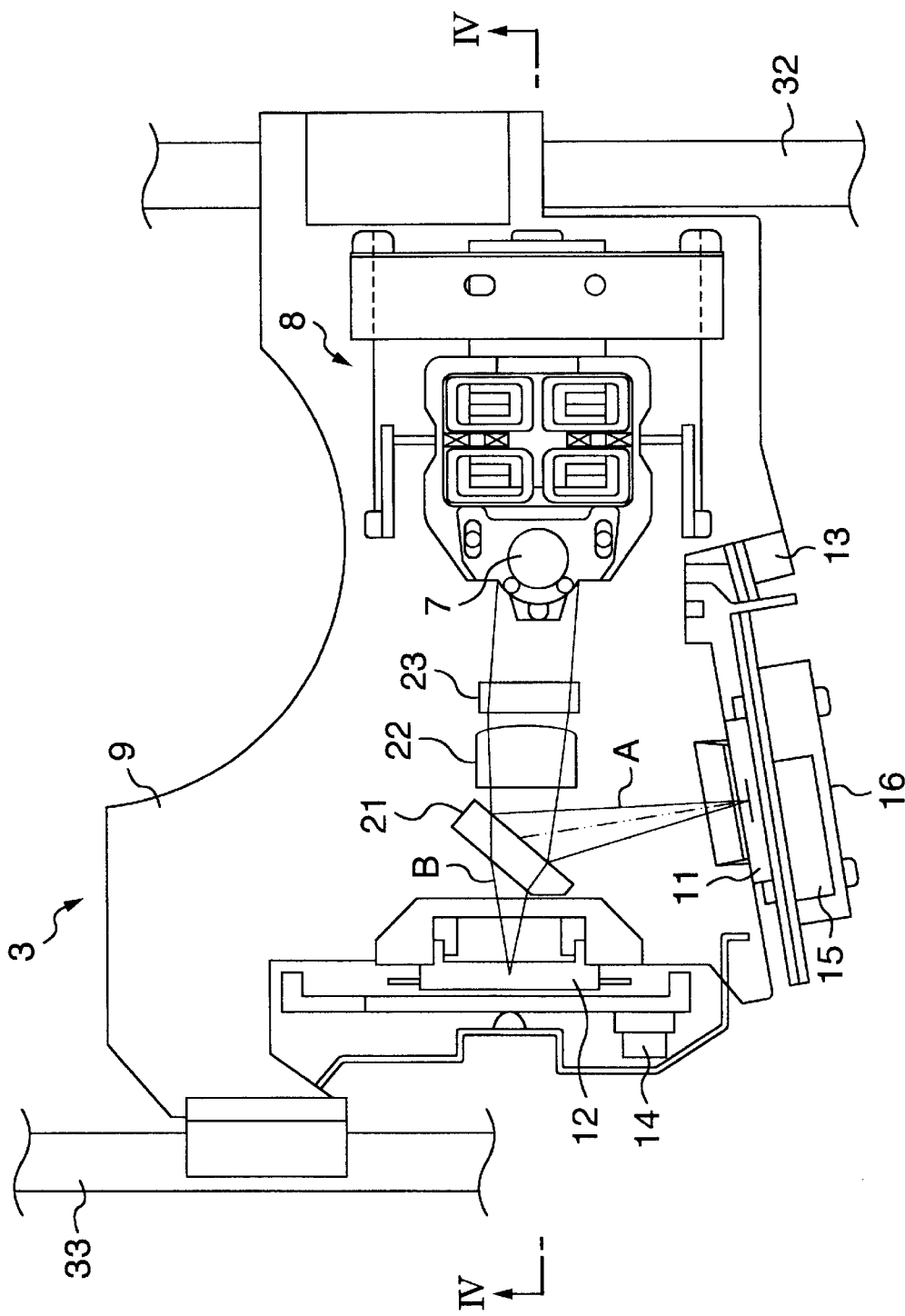
FIG. 3 is a plan view of an optical pickup of FIG. 1.

Let us first explain about the optical pickup apparatus. FIG. 1 is a plan view of the optical pickup apparatus according to embodiment 1 of the present invention; and FIG. 2 is a cross section taken along the line II—II of FIG. 1. FIG. 3 is a plan view of the optical pickup of FIG. 1, and FIG. 4 is a cross section taken along the line IV—IV of FIG. 3.

Referring to FIGS. 1 to 4, reference number 1 represents an optical disk, which may be a high-density optical disk (DVD) with a thickness from the underside (surface) to the recording plane measuring about 0.6 mm and a low-density optical disk (CD) having a thickness of about 1.2 mm from the underside to the recording plane. Designated 2 is a motor unit 2 which includes a turntable (not shown) on which to amount the optical disk 1 and a mechanism (not sown) to clamp the disk and which rotates the optical disk 1. Denoted 3 is an optical pickup, which generally includes, as described later, an actuator unit 8 for supporting an optical system 6 and an objective lens 7 and a carriage 9 holding these members and capable of moving in a radial direction of the optical disk 1. A feed unit 4 generally refers to a drive mechanism to move the carriage 9 in the radial direction of the optical disk 1. Denoted 5 is a module base on which to mount the feed unit 4, the motor unit 2 and the optical pickup 3 in a predetermined configuration. The state in which the feed unit 4, the motor unit 2 and the optical pickup 3 are assembled on the module base 5, as shown in FIG. 1, generally refers to the optical pickup apparatus.

Feed Unit

Next, the drive mechanism of the feed unit 4 will be explained. Designated 34 is a feed motor whose output shaft is mounted with a motor gear 35. In mesh with the motor gear 35 is a train gear 36 that reduces the rotation speed of the feed motor 34. The train gear 36 further meshes with a screw shaft gear 37. A screw shaft 38 to which the screw shaft gear 37 is secured has its outer circumference formed with a spiral groove. The spiral groove of the screw shaft 38 is in mesh with a rack 39, which is mounted through a leaf spring on the carriage 9. The carriage 9 engages with a support shaft 32 and a guide shaft 33 and can be moved in the radial direction of the optical disk 1.

In this state, as the feed motor 34 is rotated in a forward or reverse direction, the rack 39 is moved along the groove formed on the screw shaft 38 causing the optical pickup 3 to move in the radial direction of the optical disk 1.

Optical System

Next, the optical system 6 will be explained. The optical system 6 comprises two light sources with different wavelengths and an optical lens system. A light source with a first wavelength is an optical unit 11 that emits a laser beam A of wavelength of 635–650 nm and which integrates a semiconductor laser and a photodetector made of a light receiving element. A light source with a second wavelength is an optical unit 12 that emits a laser beam B of wavelength of 780 nm and which integrates a semiconductor laser, a diffraction grating for generating three beams from the laser beam B, a diffraction grating for guiding a reflected beam from the optical disk 1 toward a detector, and a photodetector made of a light receiving element. Further, in the optical units 11, 12 are provided volumes 13, 14, respectively, that adjust the laser beam powers of the semiconductor lasers installed in the units. In the optical unit 6 with a shorter wavelength there are arranged a superposing circuit 15 that applies superposition to the beam power of the internal semiconductor laser and a shield case 16 that covers the entire range of the superposing circuit 15 and shields unwanted radiations.

Next, the optical lens system will be described. Denoted 21 is a wedge beam splitter formed with a film which reflects a laser beam A 635–650 nm in wavelength and transmits a laser beam B 780 nm in wavelength. A collimator lens 22 transforms diffuse rays of the laser beam A into almost parallel rays and reduces a diffusion angle of diffuse rays of the laser beam B.

Further, the light sources of the optical units 11, 12 are arranged in the following relationship. The optical unit 11 is arranged at a location such that the laser beam A with the wavelength of 635–650 nm, after passing through the collimator lens 22, becomes a parallel beam. The distance of an optical path in air from the laser light source of the optical unit 11 to the collimator lens 22 is taken as L1. The optical unit 12 is arranged so that the laser beam B with the wavelength of 780 nm, after passing through the collimator lens 22, is reduced in the diffusion angle of the diffuse rays. The optical path distance in air from the laser light source of the optical unit 12 to the collimator lens 22 is taken as L2. Then, the optical units 11, 12 are also installed at positions such that the relation $0.55 \leq L2/L1 \leq 0.75$ holds.

Denoted 23 is a polarizing hologram which changes the transmitting state of the laser beams A, B according to their wavelengths. That is, the polarizing hologram 23 comprises a waveplate, which becomes a ¼ waveplate for the laser beam A of 635–650 nm wavelength and a 1/1 waveplate for the laser beam B of 780 nm wavelength, and a polarizing hologram that diffracts light at p or S wave, the waveplate and the polarizing hologram being integrated as one piece. The polarizing hologram 23 is coated with a wavelength filter which transmits the laser beam A of 635–650 nm wavelength and reflects the laser beam B of 780 nm wavelength. The wavelength filter is coated in such a shape that it has an aperture whose numerical aperture is approximately 0.45 for the laser beam B of 780 nm wavelength. Shown at 24 is a riser mirror that changes the direction of optical axes of the laser beams A, B so that their optical axes almost parallel to the optical disk 1 are directed toward the objective lens 7 in a direction almost perpendicular to the optical disk 1.

The objective lens 7 focuses the laser beams A, B onto the recording plane of the optical disk. The lens is formed to have the numerical aperture of 0.6 so that the laser beam A of 635–650 nm wavelength can be focused into a light spot about 1 $\mu$m in diameter on the high-density optical disk. Designated 8 is an actuator unit which is supported so that it can move the objective lens 7 in the focus direction as well as in the tracking direction with respect to the optical disk 1.

One of the two optical units 11, 12 is selected according to the kind of the optical disk 1 to be recorded or reproduced. The optical unit 11 is used for the high-density optical disk which has a thickness of 0.6 mm to the recording plane. For the low-density optical disk with the thickness-to-recording-plane of about 1.2 mm, the optical unit 12 is used.

Actuator Unit

Figure 6:
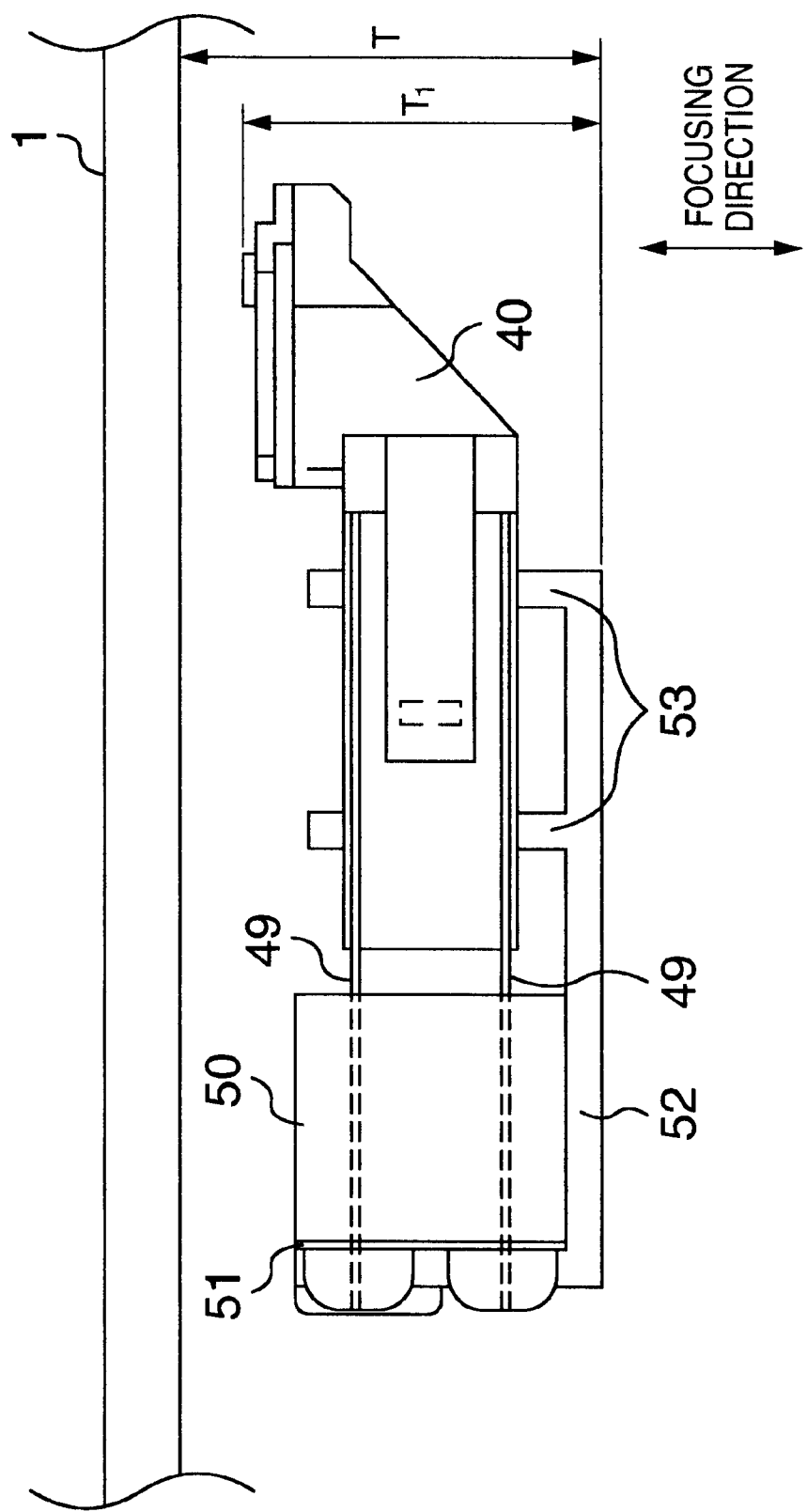
FIG. 6 is a side view as seen from an arrow C of FIG. 5.
Figure 7:
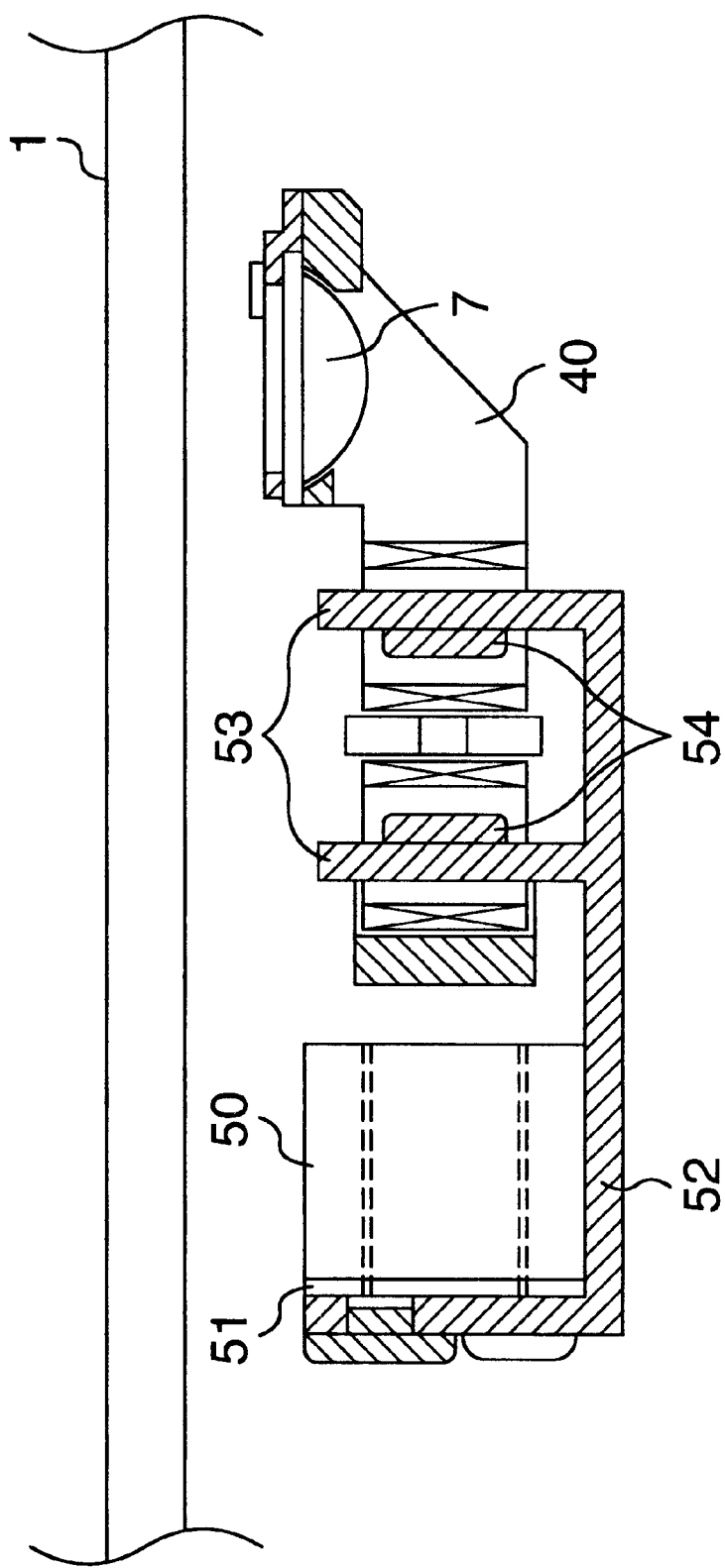
FIG. 7 is a cross section taken along the fine VII—VII of FIG. 5.

Next, the actuator unit will be explained with reference to the drawings. FIG. 5 is a plan view of the actuator unit of FIG. 3; FIG. 6 is a side view as seen from the arrow C of FIG. 5; and FIG. 7 is a cross section taken along the line VII—VII of FIG. 5. In FIGS. 5 through 7, the actuator unit 8 comprises a movable portion and a stationary portion.

First, the movable portion will be described. The objective lens 7 is secured to an objective lens holding cylinder 40 by a means such as bonding. The objective lens holding cylinder 40 is supported by two elastic tilt members 47 and mounted to a suspension holder 50 through junction substrate members 48 and four wires 49.

The objective lens holding cylinder 40 is formed in a frame structure having a circular space portion and an almost rectangular opening portion. The objective lens 7 is secured to the circular space portion by adhesive or the like. The rectangular opening portion is rigidly provided with a plurality of coils detailed in the following as by adhesive. At four equally divided sections or corners of the opening portion are secured a first focus coil 41, a second focus coil 42, a third focus coil 43 and a fourth focus coil 44. Each of the focus coils is wound on a plane parallel to the disk surface and stacked in the focusing direction to form a rectangular solenoid.

A first tracking coil 45 is fixedly installed in a gap between the first focus coil 41 and the third focus coil 43. Similarly, a second tracking coil 46 is fixedly installed in a gap between the second focus coil 42 and the fourth focus coil 44. Each of the tracking coils is wound on a plane perpendicular to the disk surface and stacked in a radial (tangential) direction of the disk to form a solenoid. A counterbalancer 60 adjusts the weight balance among all parts assembled in the objective lens holding cylinder 40 and aligns the center of gravity of the movable portion with the center of motion (an intersection between the center line of the objective lens 7 and the center line of the elastic tilt members 47) to secure a desired operation characteristic.

The elastic tilt members 47 support the objective lens holding cylinder 40. One end of each tilting elastic member 47 is secured to the side surface of the objective lens holding cylinder 40 and the other end is secured by solder to the junction substrate members 48. The positions at which the elastic tilt members 47 are fixed to the objective lens holding cylinder 40 are at the central part of the almost rectangular opening portion, i.e., at an intermediate part of the side surfaces of the holding cylinder between the first focus coil 41 and the third focus coil 43 and between the second focus coil 42 and the fourth focus coil 44 (see FIG. 5).

The junction substrate members 48 have two functions, i.e., to fix the elastic tilt members 47 and the wires 49 together and to electrically connect the wires 49 to the junction substrate members 48. Thus, the junction substrate members 48 are formed of a rigid body that can support the elastic tilt members 47 and the wires 49. Further, the junction substrate members 48 and the wires 49 are fixed together by solder. Other ends of the four wires 49 are passed through the suspension holder 50 and soldered to a flexible substrate 51 bonded to the back of the suspension holder 50. The through-holes of the suspension holder 50 are coated with silicon gel to damp vibrations of the wires 49. The elasticity of the wires 49 is set weaker than that of the elastic tilt members 47. Hence, the behavior of the objective lens holding cylinder 40 is affected by the elasticity of the wires 49.

Next, the stationary portion will be explained. The suspension holder 50 is secured, along with a yoke base 52, to the carriage 9. The yoke base 52 has four projecting yoke poles 53, and the opposing surfaces of the yoke poles 53 are each rigidly attached with a magnet 54. The yoke base 52 and the yoke poles 53 are both formed of a ferromagnetic material and, along with the magnets 54, form magnetic circuits.

The stationary portion of the above construction is fixed on the carriage 9 in the following manner. That is, after optical adjustments are made of the objective lens 7, the suspension holder 50 is secured to the carriage 9 by bonding or soldering. The suspension holder 50 has the yoke base 52 secured thereto by screws. The four yoke poles 53 fixedly attached with the magnets 54 are each inserted into central space portions of the first focus coil 41, second focus coil 42, third focus coil 43 and fourth focus coil 44 and held immovable with high positional precision. Thus, the four focus coils 41–44 and two tracking coils 45, 46 are placed in magnetic fields generated by the magnets 54. Then, the suspension holder 50 is supported at a neutral position by the two elastic tilt members 47 and the four wires 49.

The circular space portion of the objective lens holding cylinder 40 forms a space portion other than the objective lens 7 and its reinforcement ribs (see FIGS. 6 and 7). This air space provides light paths for the laser beams A, B (see FIGS. 3 and 4). It is therefore possible to guide the laser beams A, B horizontally from the opposite side of the magnetic circuits to beneath the objective lens 7. That is, because the magnetic circuits are arranged on one side with respect to the objective lens 7 and the optical system 6 is located on the opposite side, the optical system 6 and the actuator unit 8 can be installed on the same carriage 9, improving the efficiency of the space and allowing for reduction in the size and thickness of the optical pickup 3.

External Dimensions and Miniaturization Effect

Referring again to FIGS. 5 and 6, the actuator unit 8 of the present invention constructed as described above has the following external dimensions:

Width in the tracking direction W: 11 mm

Length of coil portion in the tangential direction 2D1: 6.2 mm

Length to the objective lens in the tangential direction D: 8.8 mm

Thickness in the focusing direction T1: 5.5 mm or less

Thickness of the optical pickup apparatus with the optical disk mounted T: 7.6 mm or less.

The two-dimensionally projected area of this actuator unit is equal to or slightly larger than that of the conventional actuator unit. The thickness of this actuator unit is identical to the thinnest of the conventional actuator units.

FIG. 8 illustrates a perspective view of an optical disk apparatus using the optical pickup apparatus of the present invention and the cross section of the optical disk apparatus taken along the line VIII—VIII. In FIG. 8, denoted 81 is a turntable on which to mount the optical disk 1 and which is driven by a spindle motor 82. Designated 83 is a tray to draw out the optical pickup apparatus along with the carriage 9 from the optical disk apparatus. A case 84 houses the tray 83 and also forms an outer housing for the optical disk apparatus. The thickness T in the figure is the same as T shown in FIG. 6 and is 7.6 mm or less (from the underside of the optical disk 1 to the underside of the actuator unit 8) when an optical disk is loaded in the optical pickup apparatus.

TC represents an overall thickness of the optical disk apparatus including the thicknesses of a tray 83 accommodating mechanism, an optical disk 1 rotating mechanism and their margin space. The use of the optical pickup apparatus of this invention allows the overall thickness of the optical disk apparatus TC to be set to 12.7 mm (½ inch) or less because T is very small. As a result, the computer using this optical disk apparatus can be made very thin. Alternatively, the computer that has used only one conventional optical disk apparatus can now use two optical disk apparatus of this invention.

Conductor Construction

Figure 9:
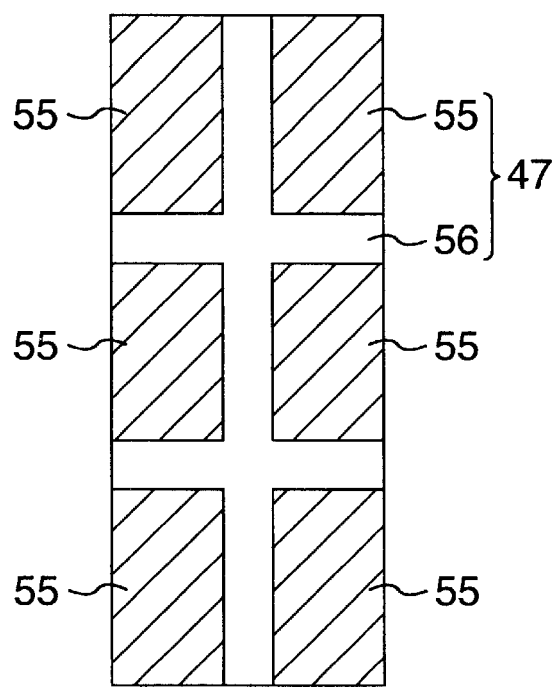
FIG. 9 is a cross section of an elastic member for tilting.

The construction described above constitutes a moving coil type construction in which coils are arranged in the movable portion. Thus, the four wires 49 and two elastic tilt members 47 also have a function of supplying electric current to the respective coils. FIG. 9 shows a cross section of the tilting elastic member 47 and FIG. 10 a cross section of the wire 49. These four wires 49 and two elastic tilt members 47 are each wire-like conductive elastic members having functions both as elastic members and as conducting wires. Their cross sections, either circular or rectangular, are selected based on which cross section is appropriate for exploiting the elastic function described later.

Figure 10:
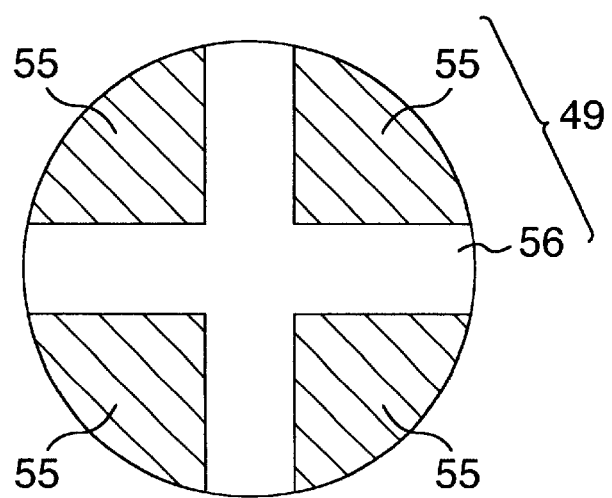
FIG. 10 is a cross section of a wire.

As shown in FIGS. 9 and 10, both the wire 49 and the tilting elastic member 47 have a structure in which a silicon-based insulating gel 56 for damping is interposed between a plurality of conductive wire-like elastic members 55 arranged at predetermined intervals. In the examples shown in these figures, one wire 49 can supply electricity to two circuits and four wires eight circuits; and one tilting elastic member 47 can supply electric current to three circuits and two elastic members six circuits.

The silicon-based insulating gel 56 may suitably use such materials as silicone rubber. Such materials can electrically insulate the conductive wire-like elastic members 55 from each other. At the same time, the insulating gel 56 has such a degree of resiliency as will not spoil the elasticity of the tilting elastic member 47 and the wire 49 and thus can suppress vibrations of the tilting elastic member 47 and the wire 49 and prevent natural vibrations from occurring in the movable portion as a whole.

The number of conductive wire-like elastic members 55 used in one wire or tilting elastic member is not limited to those of the above examples and may be increased or decreased as required by design. Further, the circuits that cannot be supplied with electricity by the wires 49 or the elastic tilt members 47 may be connected with other wiring (such as flexible printed circuits, not shown) to feed current to each focus coil and tracking coil.

Replay Operation

The operation of replaying optical disks 1 with different recording densities will be described as follows.

Let us first explain about the reproduction of signals of a high-density optical disks. The laser beam A with a wavelength of 635–650 nm emitted from the semiconductor laser of the optical unit 11 is reflected by the wedge beam splitter 21, rendered parallel by the collimator lens 22, passed through the polarizing hologram 23 and reflected by the riser mirror 24 to enter the objective lens 7. The laser beam A is then converged by the objective lens 7 before entering the high-density optical disk and is focused on a recording plane, situated about 0.6 mm inside the surface in the direction of thickness of the high-density optical disk, where it forms an image. Light reflected from the recording plane again passes through the objective lens 7 and follows the previously traveled path backward to reach the light receiving element of the optical unit 11.

When a signal is to be recorded into or reproduced from a low-density optical disk, a laser beam B with a wavelength of 780 nm emitted from the semiconductor laser of the optical unit 12 is formed into three beams while it passes through a diffraction grating, and then the three beams pass through the wedge beam splitter 21. Next, these three beams pass through the collimator lens 22 and undergo an aperture restriction with a numerical value of about 0.45 when they pass through the polarizing hologram 23. Further, these beams are reflected by the riser mirror 24 to enter the objective lens 7. The laser beams B are converged by the objective lens 7 before entering the low-density optical disk, and is focused on the recording plane situated about 1.2 mm inside the surface in the direction of thickness of the low-density optical disk. The reflected light from the recording plane again passes through the objective lens 7 and follows the same path back to the optical unit 12. The reflected light from the recording plane is diffracted by the diffraction grating to arrive at the photodetector.

Action

In the above recording and reproducing operation, the focusing control and the tracking control are performed on the objective lens 7 to focus the laser beams A, B on the recording plane. The operation of the actuator unit 8 required for the focusing control and the tracking control will be explained below.

First, the operation of the tracking control is explained. In FIG. 5, the first tracking coil 45 and the second tracking coil 46 are connected in series. The wires on one side of the tracking coil are wound perpendicular to the sheet of FIG. 5 (at right angle to the surface of the optical disk 1). Further, the one side of the tracking coil is situated in the magnetic field formed by the opposing magnets 54. Hence, when a current is applied in a predetermined direction to the first tracking coil 45 and the second tracking coil 46, an electromagnetic force in the radial direction (top-down direction of the sheet) of FIG. 5 is produced in the first tracking coil 45 and the second tracking coil 46 according to the Fleming's left-hand rule. As a result, the four wires 49 are elastically deformed, moving the objective lens holding cylinder 40 in the tracking direction. The electromagnetic force in the tracking direction acts on the elastic tilt members 47 in the buckling direction, so that the elastic tilt members 47 are not deformed.

Next, the focusing control action will be explained. Currents to the first to fourth focus coils 41–44 are controlled independently. At this time, the currents applied to the focus coils 41–44 are controlled in such a manner that the objective lens holding cylinder 40 is displaced upward (or downward) in the focusing direction. The focus coils 41–44 are wound in rectangles, each enclosing the yoke pole 53 and the magnet 54, on a plane parallel to the sheet of FIG. 5 (in a plane parallel to the surface of the optical disk 1). Further, one side of each focus coil 41–44 is situated in the magnetic field formed by the opposing magnets 54. The above-described current control, therefore, generates an electromagnetic force in a direction perpendicular to the sheet of FIG. 5 (in the focusing direction of FIG. 6) in each of the focus coils 41–44 according to the Fleming's left-hand rule. As a result, the four wires 49 are deformed to displace the objective lens holding cylinder 40, which holds the objective lens 7, in the focusing direction. Because the elastic tilt members 47 have a predetermined flexural rigidity in the focusing direction (the elasticity of the wires 49 is set weaker than that of the elastic tilt members 47, as described before), the elastic tilt members 47 are not deformed and do not affect the movement of the objective lens 7 at all.

The above-described control actions in the tracking direction and in the focusing direction both concern the parallel movement of the objective lens 7 by the deformation of the four wires 49. Now, a pivoting operation of the objective lens 7, i.e., a tilt control in two directions, will be explained. For example, a current control is performed on the first focus coil 41 and the third focus coil 43 to displace the objective lens holding cylinder 40 upward in the focusing direction (in a direction toward the optical disk 1). The second focus coil 42 and the fourth focus coil 44 are current-controlled to displace the objective lens holding cylinder 40 downward in the focusing direction (in a direction away from the optical disk 1). These current controls produce a moment which tends to rotate the objective lens holding cylinder 40 in the radial direction. The objective lens holding cylinder 40 is thus tilted in the radial direction of the optical disk 1 about the pivoting axis extending in the tangential direction through the objective lens 7. At this time, four wires 49 are deflected allowing the objective lens holding cylinder 40 to be tilted in the radial direction. By reversing the directions of the above current controls, it is of course possible to produce the tilting in the opposite direction.

Then, a tilt control in another direction will be described. For example, a current control is performed on the first focus coil 41 and the second focus coil 42 to move the objective lens holding cylinder 40 upward (toward the optical disk 1). The third focus coil 43 and the fourth focus coil 44 are current-controlled to move the objective lens holding cylinder 40 downward (away from the optical disk 1). These current controls generate a moment which tends to rotate the objective lens holding cylinder 40 in the tangential direction of the optical disk 1 about the center axis of the elastic tilt members 47 as a rotating center. The objective lens holding cylinder 40 therefore is tilted in the tangential direction of the optical disk 1. At this time, as in the conventional apparatus, the fixed ends of the wires 49 on the side of the junction substrate members 48 are not displaced in the tangential direction. This is because they cannot be moved in the tangential direction, which is also true with the conventional apparatus. For example, when the four wires 49 consist of an upper group of two wires and a lower group of two wires, a displacement that will cause the upper group of wires 49 to be extended and the lower group of elastic members to be contracted cannot be produced.

However, because the moment is produced about the elastic tilt members 47 as a pivoting axis, the elastic tilt members 47 are twisted, allowing the objective lens holding cylinder 40 to be tilted in the tangential direction. Further, because the elastic tilt members 47 work as a torsion bar, their torsional stress can easily be adjusted by the length of the elastic tilt members 47. It is of course possible to produce the tilting in the opposite direction by reversing the directions of the above current controls. Placing the elastic tilt members 47 between the objective lens holding cylinder 40 and the wires 49 in this way therefore facilitates the tilting of the objective lens holding cylinder 40 in the tangential direction and allows the tilt control with a small driving force.

Miniaturizing and Thinning Effect

As described above, with the optical pickup apparatus of the invention, the tilt control in the radial direction and in the tangential direction with respect to the optical disk can be performed by differentiating the current values applied to the four focus coils. By controlling the currents applied to the four focus coils with the current difference values maintained, it is possible to carry out the focusing operation while maintaining the tilt control.

Therefore any skew between the optical disk and the objective lens can be corrected both in the tangential and radial directions. Because the optical pickup can reliably radiate a beam perpendicularly onto the optical disk, recording and reproducing can be done reliably for a higher density optical disk (such as an optical disk using a blue short wavelength laser beam) and a lower precision optical disk.

Further, because the magnetic circuits are arranged on one side of the objective lens and the optical system on the opposite side, the utilization of the space can be improved and an optical pickup apparatus with reduced size and thickness can be realized. This in turn allows for a reduction in the overall size and thickness of the optical disk apparatus.

A Tracking Coil

Figure 11:
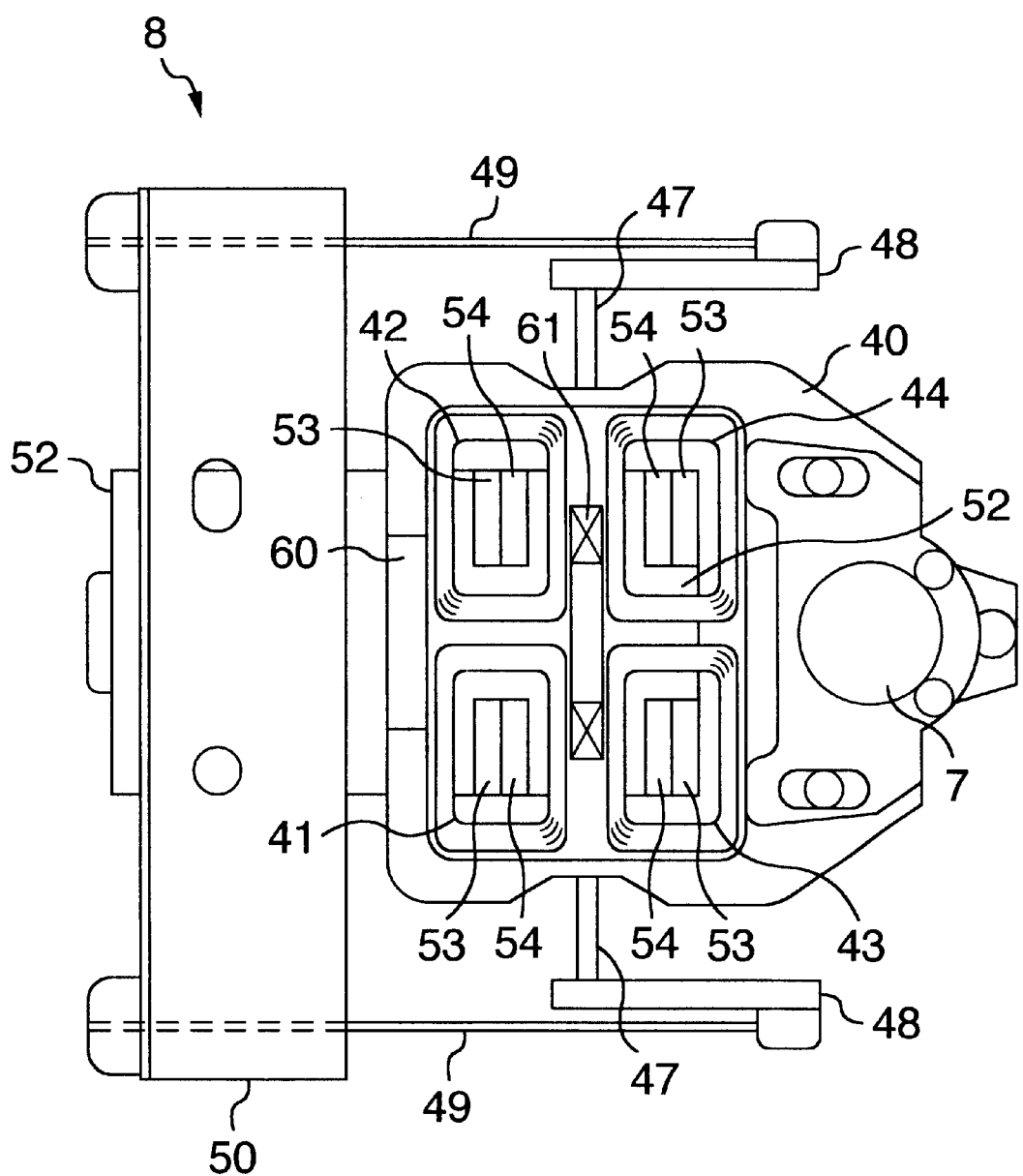
FIG. 11 is a plan view of an actuator unit using one tracking coil.

The above description concerns a case where two tracking coils are used. To further simplify the construction, we will explain about an example using one tracking coil. FIG. 11 is a plan view of the actuator unit using one tracking coil. In FIG. 11, reference number 61 denotes a tracking coil. The tracking coil 61 is similar in construction to the tracking coils of FIG. 5, except for the shape and arrangement.

The tracking coil 61 is wound in a rectangular shape, with one side of the rectangle disposed in a gap between the first focus coil 41 and the third focus coil 43 and with another side of the rectangle disposed in a gap between the second focus coil 42 and the fourth focus coil 44. Both of these sides are situated in the magnetic fields of the opposing magnets 54. Thus, the direction of current flowing through one side of the rectangle is opposite to the direction of current flowing through the other side of the rectangle. Therefore, the orientation of a magnetic pole formed by the magnets 54 disposed between the first focus coil 41 and the third focus coil 43 is set opposite to the orientation of a magnetic pole formed by the magnets 54 disposed between the second focus coil 42 and the fourth focus coil 44.

With this arrangement, it is possible to perform the tracking operation by using a single tracking coil 61. The focusing operation, the tilt control operation and the reproducing operation are similar to those performed when two tracking oils are used. Using a single tracking coil in this way can simplify the construction and reduce the mass of the moving portion, which in turn enhances the operation sensitivity of the actuator and reduces the weight of the optical pickup.

Embodiment 2

MM Type

Figure 12:
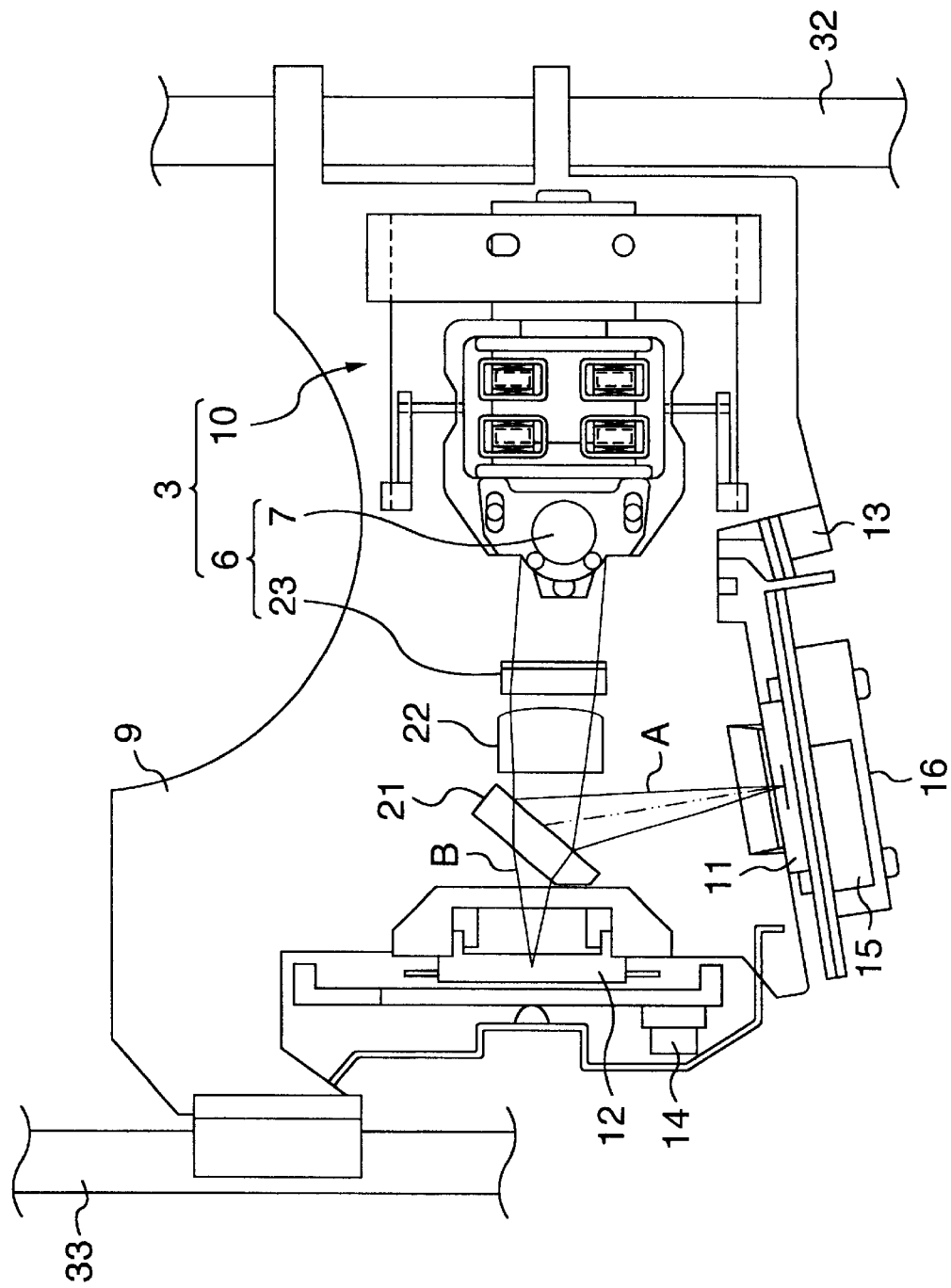
FIG. 12 is a plan view of an optical pickup according to a second embodiment of the present invention.
Figure 13:
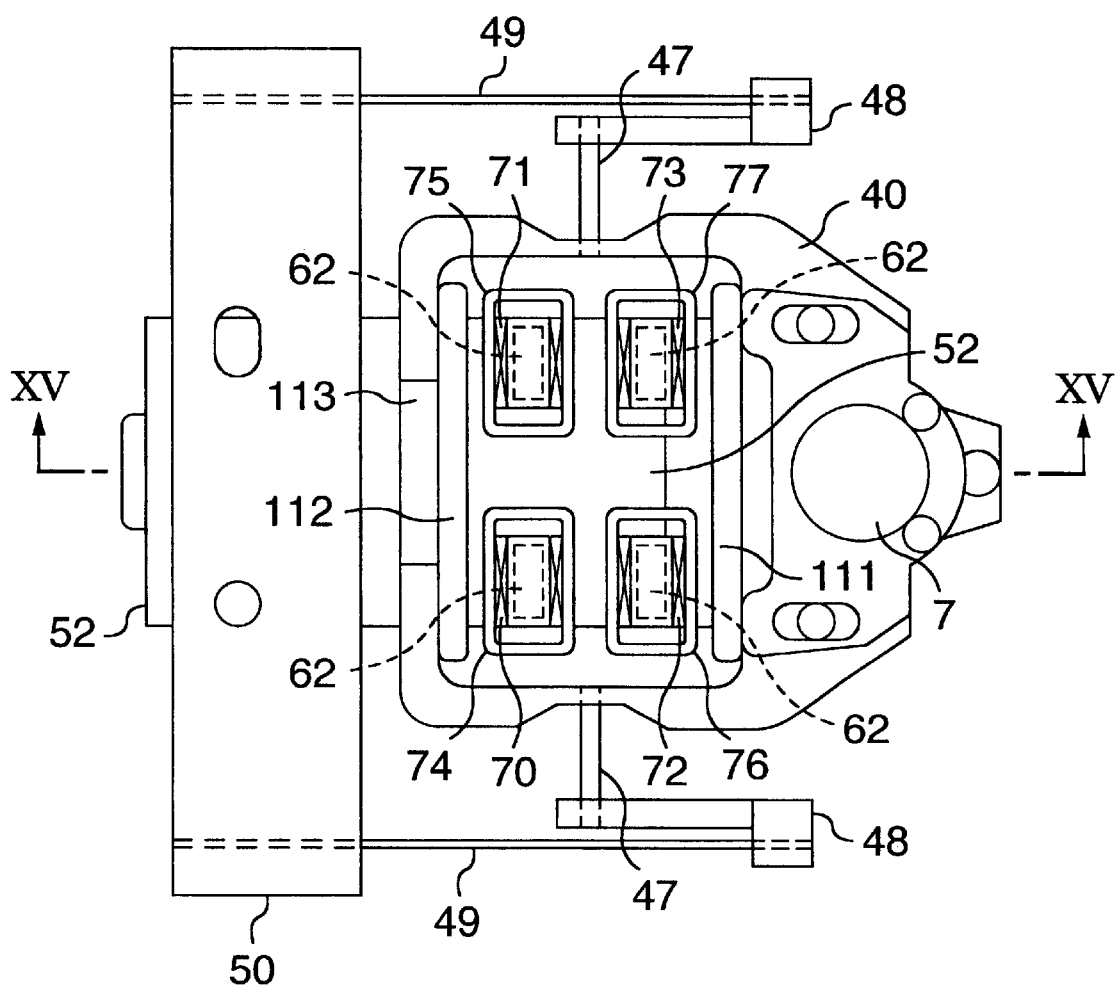
FIG. 13 is a plan view of an actuator unit of FIG. 12.
Figure 14:
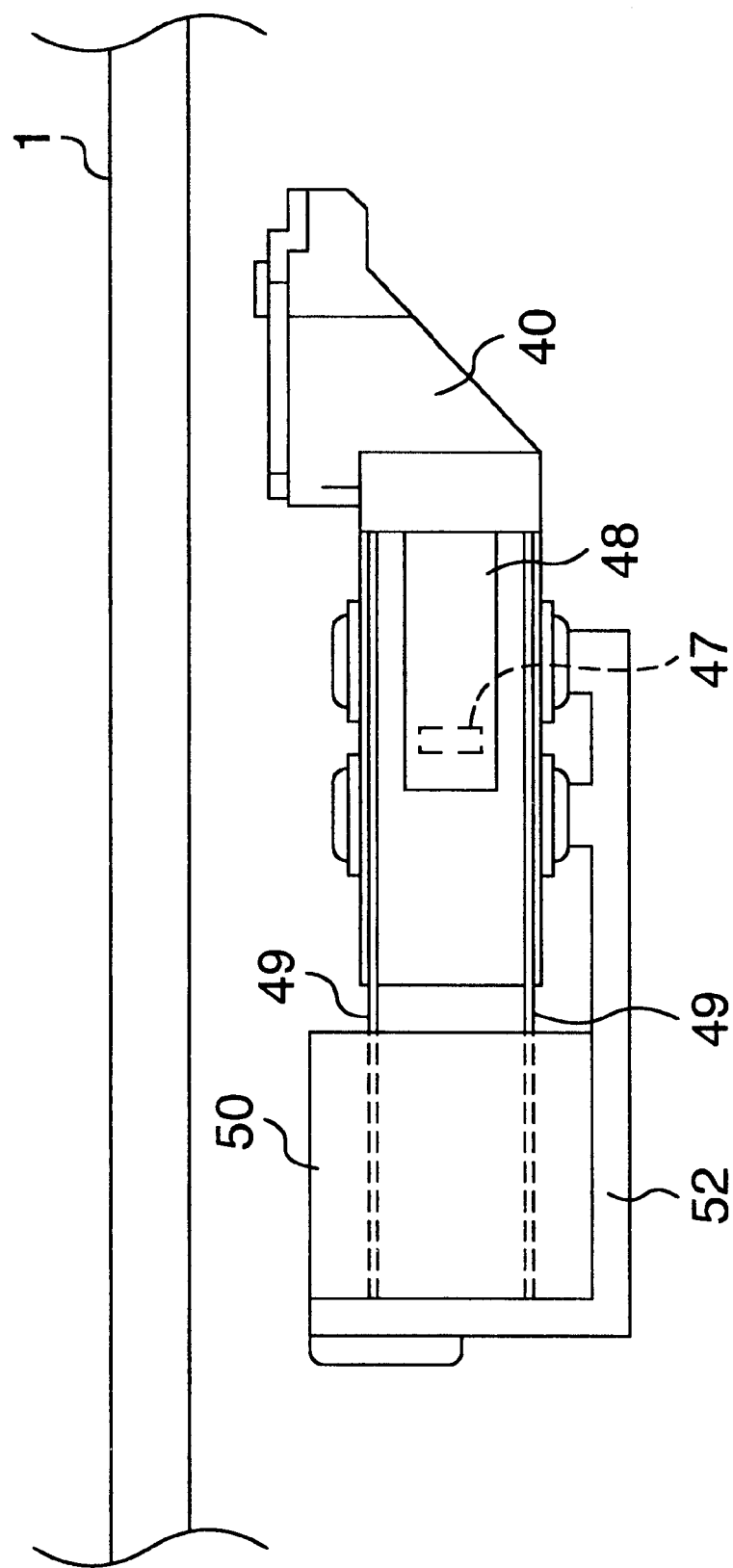
FIG. 14 is a side view as seen from an arrow D of FIG. 13.
Figure 15:
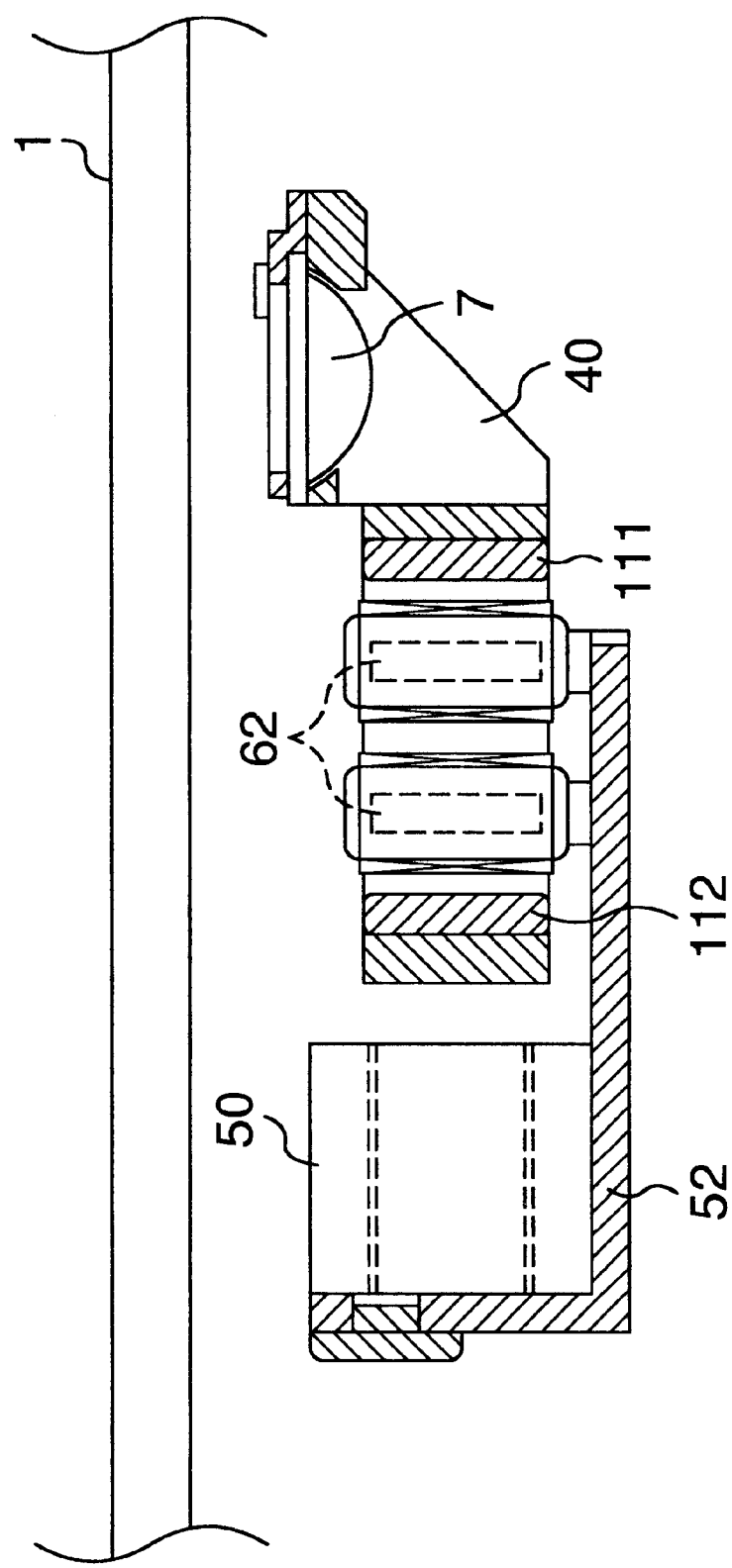
FIG. 15 is a cross section taken along the line XV—XV of FIG. 13.

The embodiment 1 described above is a moving coil type in which coils are arranged in the movable portion. It is also possible to construct a moving magnet type in which magnets are arranged in the movable portion. An actuator unit of the moving magnet type will be described with reference to the drawings. FIG. 12 is a plan view of an optical pickup according to the embodiment 2 of the present invention. FIG. 13 is a plan view of an actuator unit of FIG. 12. In FIGS. 12 and 13, an optical pickup 3 and an optical system 6 are the same as those explained in the embodiment 1 and their explanations are not repeated. Designated 10 is an actuator unit 10 of a moving magnet type which will be detailed in the following. FIG. 14 is a side view as seen from an arrow D of FIG. 13. FIG. 15 is a cross section taken along the line XV—XV of FIG. 13. In FIGS. 13 through 15, the actuator unit 10 comprises a movable portion and a stationary portion.

Movable Portion

First, the movable portion will be explained. An objective lens 7 is secured to the objective lens holding cylinder 40 by such a means as bonding. The objective lens holding cylinder 40 is supported by two elastic tilt members 47 and is mounted to a suspension holder 50 through junction substrate members 48 and four wires 49. The objective lens holding cylinder 40 is formed in a frame structure having a circular space portion and an almost rectangular opening portion. The objective lens holding cylinder 40, the elastic tilt members 47, the junction substrate members 48, the wires 49 and the suspension holder 50 are identical with those described in the embodiment 1 and their explanations are omitted here. Although the moving magnet type of this embodiment does not require an electric conduction function of the elastic tilt members 47, the junction substrate members 48 and the wires 49, the function of suppressing vibrations by combining conductive wire-like elastic members 55 and insulating gel 56 is also useful as in the moving coil type of the embodiment 1. This can prevent natural vibrations from occurring in the entire movable portion.

The objective lens 7 is secured to the circular space portion as by adhesive. A plurality of magnets detailed below are secured to the rectangular opening portion by adhesive or the like. First, on a side of the rectangular opening portion close to the objective lens 7, a first magnet 111 is installed. A second magnet 112 is installed on an opposite side of the rectangular opening far from the objective lens 7 (a side closer to the suspension holder 50). The first magnet 111 and the second magnet 112 are formed as almost parallel flat plates of a size conforming to the side surfaces of the rectangular opening portion of the objective lens holding cylinder 40.

The first magnet 111 is magnetized such that it has an N pole on the side of the objective lens 7 and an S pole on the opposite side (on the rectangular opening portion side). The second magnet 112 is magnetized to have an N pole on the side of the objective lens 7 (on the rectangular opening portion side) and an S pole on the other side (on the side close to the suspension holder 50). That is, in the rectangular opening portion a magnetic field is produced by the first magnet 111 and the second magnet 112. Denoted 113 is a counterbalancer which adjusts the weight balance of all parts assembled in the objective lens holding cylinder 40 to align the center of gravity of the movable portion with the center of motion (an intersection between the center line of the objective lens 7 and the center line of the elastic tilt members 47) to obtain a desired operation characteristic.

Stationary Portion

Next, the stationary portion will be explained. The suspension holder 50 is secured to a carriage 9 along with a yoke base 52. The yoke base 52 has four cores 62. The yoke base 52 and the cores 62 are both formed of a ferromagnetic material. The surfaces of the cores 62 are covered with a resin material for insulation. The four cores 62 are wound with a first tracking coil 70, a second tracking coil 71, a third tracking coil 72, and a fourth tracking coil 73, respectively. These tracking coils 70–73 are wound in a plane perpendicular to the disk surface and arranged so that the wound coil cylinders are directed in a radial direction of the optical disk.

Further, around these tracking coils 70–73 are wound a first focus coil 74, a second focus coil 75, a third focus coil 76, and a fourth focus coil 77, respectively. These focus coils 74–77 are wound in a plane parallel to the disk surface and arranged so that the wound coil cylinders are directed in a focusing direction. Finally, for insulation, protection and fixing of coils and for its bonding to the yoke base 52, a block of cores, tracking coils and focus coils is coated with a resin material and bonded to the yoke base 52.

Arrangement

The stationary portion constructed as described above is fixed to the carriage 9 in the following manner. That is, after optical adjustments are made of the objective lens 7, the suspension holder 50 is secured to the carriage 9 by bonding or soldering. The suspension holder 50 has the yoke base 52 secured thereto by screws. The four cores 62 fixedly attached with the tracking coils and the focus coils are inserted into a space portion in the magnetic field produced by the first magnet 111 and the second magnet 112 and held immovable with high positional precision. In this way the suspension holder 50 is supported at a neutral position by the two elastic tilt members 47 and the four wires 49.

The external shape of the objective lens holding cylinder 40 is the same as that explained in the embodiment 1, so the laser beams A, B can be introduced from the opposite side of the magnetic circuit to beneath the objective lens 7. Thus, because the magnetic circuit is arranged on one side of the objective lens 7 and the optical system 6 on the other side, utilization of the pace can be improved and an optical pickup apparatus 3 with reduced size and thickness can be realized. Similarly, the two-dimensionally projected area of this actuator unit is equal to or slightly larger than that of the conventional actuator unit, and the thickness of this actuator unit is identical to the thinnest of the conventional actuator units. Further, because the thickness of the optical disk apparatus when loaded with an optical disk is 7.6 mm or less, the overall thickness of the optical disk apparatus as a whole can be made equal to or less than 12.7 mm (½ inch).

Now, the operation of the optical pickup apparatus of the embodiment 2 of this invention with the above-described construction will be explained. The recording and reproducing operation of the optical disk 1 are the same as those of the embodiment 1, so their explanations are not repeated here. The operation of the actuator unit 8 during the focusing control and the tracking control for the objective lens 7 will be explained in the following.

First, the operation of the tracking control will be described. In FIGS. 13 to 15, the first tracking coil 70, the second tracking coil 71, the third tracking coil 72 and the fourth tracking coil 73 are connected in series. When currents are applied in predetermined directions to respective coils, magnetic fields are produced according to the corkscrew rule in the cores 62. Then, there occur attraction and repulsion between the magnetic fields of the cores 62 and the magnetic field produced by the first magnet 111 and the second magnet 112 of the objective lens holding cylinder 40. As a result, a driving force induced by the attraction and repulsion acts on the first magnet 111 and the second magnet 112, which in turn causes the objective lens holding cylinder 40 to move in the radial direction, elastically deforming the four wires 49. This driving force in the radial direction acts on the elastic tilt members 47 in a buckling direction and therefore the elastic tilt members 47 will not be deformed.

Next, the focusing control operation will be described. The currents applied to the first to fourth focus coils 74–77 are controlled independently of each other. At this time, the currents applied to the focus coils 74–77 are controlled to displace the objective lens holding cylinder 40 upward (or downward) in the focusing direction. This current control generates a magnetic field in each of the cores 62 according to the corkscrew rule. Then attraction and repulsion occur between the magnetic fields of the cores 62 and the magnetic field generated by the first magnet 111 and the second magnet 112 of the objective lens holding cylinder 40. As a result, a driving force induced by the attraction and repulsion acts on the first magnet 111 and the second magnet 112, which in turn causes the objective lens holding cylinder 40 to move in the focusing direction, elastically deforming the four wires 49. Because the elastic tilt members 47 have a predetermined flexural rigidity in the focusing direction (the elasticity of the wires 49 is set weaker than that of the elastic tilt members 47, as described before), the elastic tilt members 47 are not deformed and do not affect the movement of the objective lens 7 at all.

Now, the operation of a tilt control in two directions will be explained. For example, a current control is performed on the first focus coil 74 and the third focus coil 76 to displace the objective lens holding cylinder 40 upward in the focusing direction (in a direction toward the optical disk 1). The second focus coil 75 and the fourth focus coil 77 are current-controlled to displace the objective lens holding cylinder 40 downward in the focusing direction (in a direction away from the optical disk 1). These current controls produce a driving force based on attraction and repulsion which generates a moment that tends to rotate the objective lens holding cylinder 40 in the radial direction. The objective lens holding cylinder 40 is thus tilted in the radial direction of the optical disk 1 about the rotating axis extending in the tangential direction through the objective lens 7. At this time, four wires 49 are deflected allowing the objective lens holding cylinder 40 to be tilted in the radial direction. By reversing the directions of the above current controls, it is of course possible to produce the tilting in the opposite direction.

Then, a tilt control in another direction will be described. For example, a current control is performed on the first focus coil 74 and the second focus coil 75 to move the objective lens holding cylinder 40 upward (toward the optical disk 1). The third focus coil 76 and the fourth focus coil 77 are current-controlled to move the objective lens holding cylinder 40 downward (away from the optical disk 1). These current controls generate a driving force based on the attraction and repulsion which in turn produces a moment that tends to rotate the objective lens holding cylinder 40 in the tangential direction of the optical disk 1 about the center axis of the elastic tilt members 47 as a rotating center. The objective lens holding cylinder 40 therefore is tilted in the tangential direction of the optical disk 1. At this time, the fixed ends of the wires 49 on the side of the junction substrate members 48 are not displaced in the tangential direction. The elastic tilt members 47 on the other hand are twisted allowing the objective lens holding cylinder 40 to be tilted in the tangential direction. Further, the torsional stress of the elastic tilt members 47 can easily be adjusted by the length of the elastic tilt members 47. The above-described operation is similar to that of the embodiment 1 and thus detailed descriptions are not repeated here.

As detailed above, the optical pickup apparatus according to the embodiment 2 of the invention has a moving magnet type construction with four focus coils and enables the tilt control in the radial and tangential directions of the optical disk. It is therefore possible to correct any skew between the optical disk and the objective lens in both the tangential and radial direction. Because the optical pickup can reliably throw a beam perpendicularly onto the optical disk, recording and reproducing can be done reliably for a higher density optical disk (such as an optical disk using a blue short wavelength laser beam) and a lower precision optical disk, as in the moving coil type. Further, it is possible to form a small and thin optical pickup and thus can reduce the overall size and thickness of the optical disk apparatus as a whole. Further, because only the magnets are arranged in the movable portion, a robust construction can be realized.

Weight Reduction 1

In the actuator unit of the moving magnet type described above, a construction for achieving a weight reduction is described below. FIG. 16 is a plan view showing another actuator unit in FIG. 12. Where the construction of FIG. 16 differs from that of FIG. 13 is that the magnets are divided into four equal parts, i.e., a first magnet 121, a second magnet 122, a third magnet 123 and a fourth magnet 124. The first magnet 121 and the second magnet 122 are arranged symmetric with respect to an axis extending in the tangential direction through the center of the objective lens 7. Likewise, the third magnet 123 and the fourth magnet 124 are arranged symmetric with respect to an axis extending in the tangential direction through the center of the objective lens 7. The first to fourth magnets 121–124 are arranged so that each of them has a magnetic pole N on the side close to the objective lens 7, as in FIG. 13. Other arrangements such as focus coils 74–77, tracking coils 70–73 and wires 49 are identical with those of FIG. 13.

Therefore, the tracking operation, focusing operation and tilting operation are also similar to those of FIG. 13, except that the first to fourth magnets 121–124 are arranged close to the cores 62 and the central part remote from the cores 62 is made simply a space. Therefore, the magnets, since they are divided, become smaller in size and the overall volume of the magnets also becomes smaller, which in turn reduces the mass of the movable portion to that extent. Further, because the areas near the cores 62 have concentrated fluxes and relatively high flux densities and because the fist to fourth magnets 121–124 are installed in such areas, the driving force induced by attraction and repulsion becomes stronger. Combined with the reduction in mass, the increased driving force can improve the operation sensitivity of the actuator unit 10.

Weight Reduction 2

Figure 17:
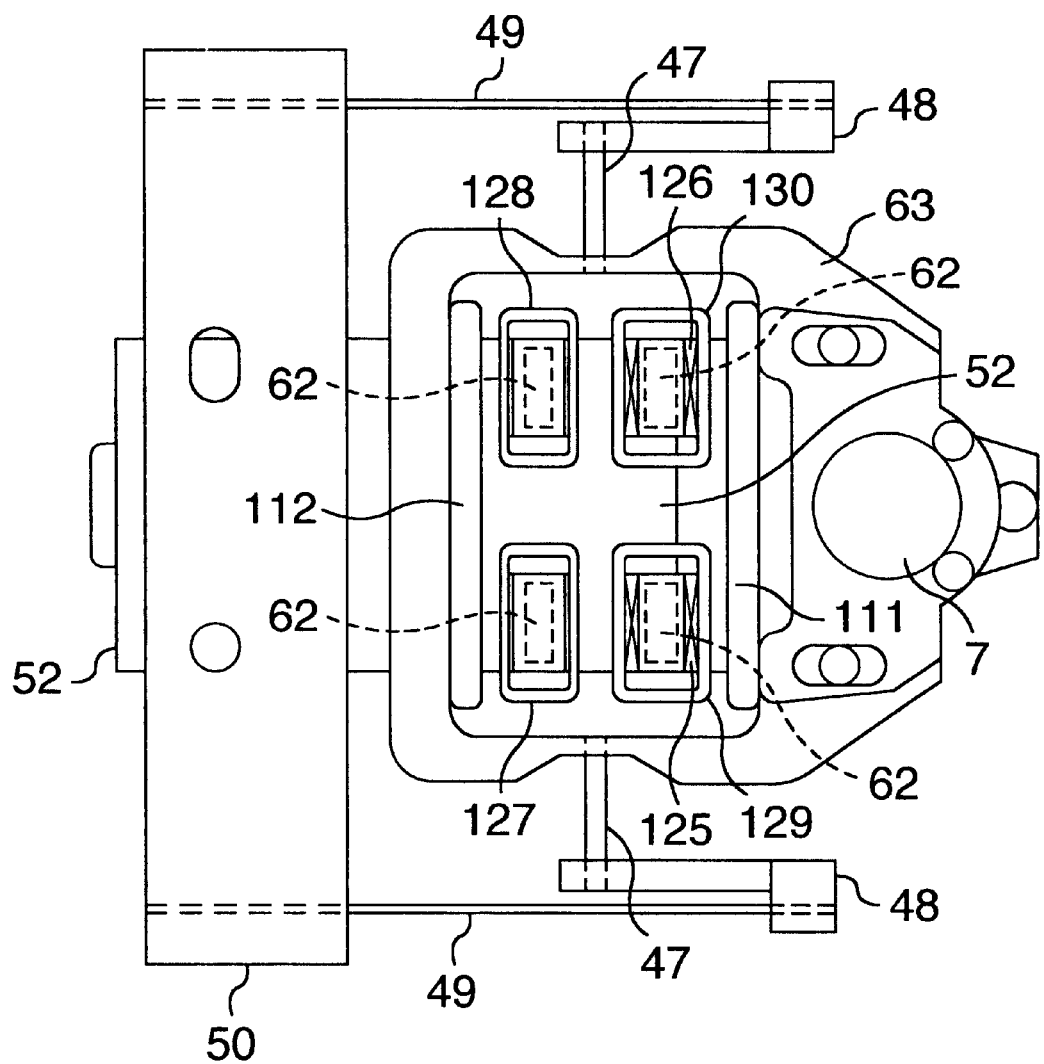
FIG. 17 is a plan view of still another actuator unit in FIG. 12.

Another construction for reducing the weight of The actuator unit is described in the following. FIG. 17 is a plan view of the another actuator unit in FIG. 12. Where the construction of FIG. 17 differs from that of FIG. 13 is that the number of the tracking coils is reduced to two, i.e., a first tracking coil 125 and a second tracking coil 126 are arranged in the cores 62 on the side close to the objective lens 7. Their outer circumferences are wound with a third focus coil 129 and a fourth focus coil 130. The combination of these tracking coils and focus coils is the same as that shown in FIG. 13.

The cores 62 on the far side from the objective lens 7 are wound with a first focus coil 127 and a second focus coil 128, respectively. Because the first focus coil 127 and the second focus coil 128 have no tracking coils at their center, their finished size are small even if the required numbers of turns are wound. Further, because the first focus coil 127 and the second focus coil 128 have the small finished external sizes, a portion of the objective lens holding cylinder 63 near the frame type suspension holder 50 (a portion near the first focus coil 127 and the second focus coil 128) can be made thick, obviating the need for the counter balancer. Other portions than those described above, such as the arrangement of the magnet poles and wires 49, are all identical with those shown in FIG. 13.

Therefore, the tracking operation, the focusing operation and the tilt operation are similar to those previously described with reference to FIG. 13. However, because the tracking coils are reduced in number and the counter balancer is eliminated, the mass of the movable portion is reduced, improving the operation sensitivity of the actuator unit 10.

Weight Reduction 3

Figure 18:
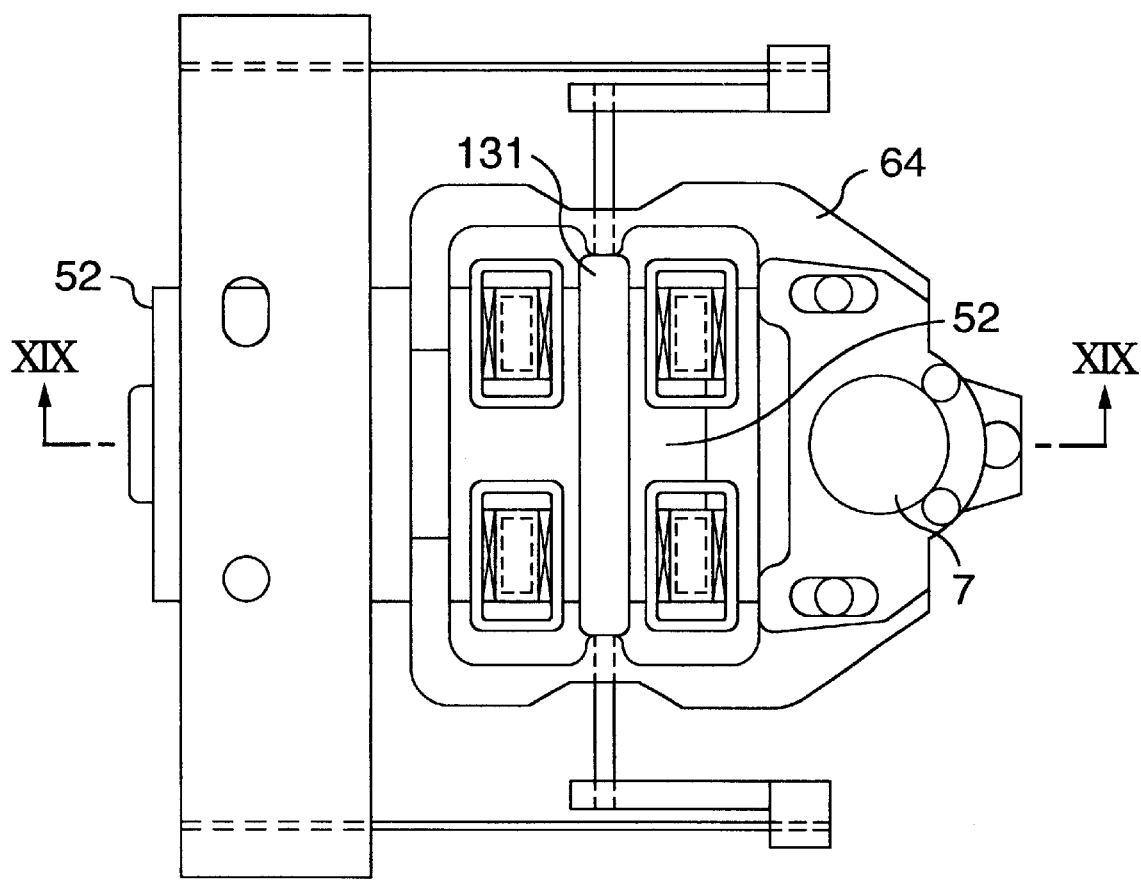
FIG. 18 is a plan view of a further actuator unit of FIG. 12.
Figure 19:
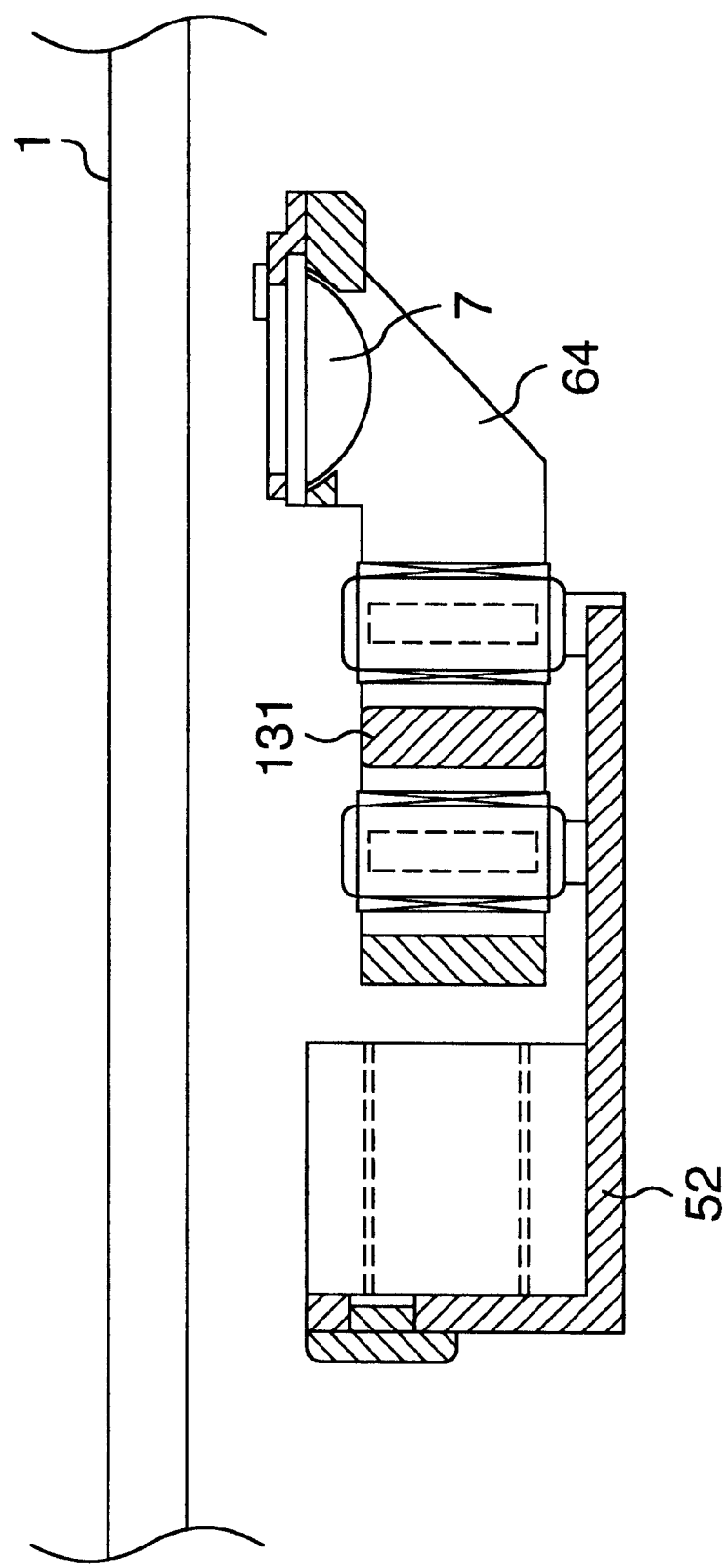
FIG. 19 is a cross section taken along the line XIX—XIX of FIG. 18.

Further, still another construction for reducing the weight of the actuator unit is described below. FIG. 18 is a plan view of the still another actuator unit in FIG. 12. FIG. 19 is a cross section taken along the line XIX—XIX of FIG. 18. Where the construction of FIG. 18 differs from that of FIG. 13 is that only one magnet is placed at the center of the rectangular opening portion. That is, an objective lens holding cylinder 64 has a frame type structure with a circular space portion and an almost rectangular opening portion. At the magnet 131 is placed at the center of the almost rectangular opening portion in the radial direction and fixed by adhesive or the like. The magnet 131 is shaped like a flat plate and magnetized such that it has an N pole on the side of the objective lens 7 and an S pole on the other side (or opposite side).

Other portions than those described above, including tracking coils, focus coils and wires 49, are all identical with those shown in FIG. 13. Hence, the tracking operation, the focusing operation and the tilt operation are also similar to those described in connection with FIG. 13. However, because the two magnets are reduced to one, the mass of the movable portion is reduced and the operation sensitivity of the actuator unit 10 can be improved over that of FIG. 13.

Weight Reduction 4

Figure 20:
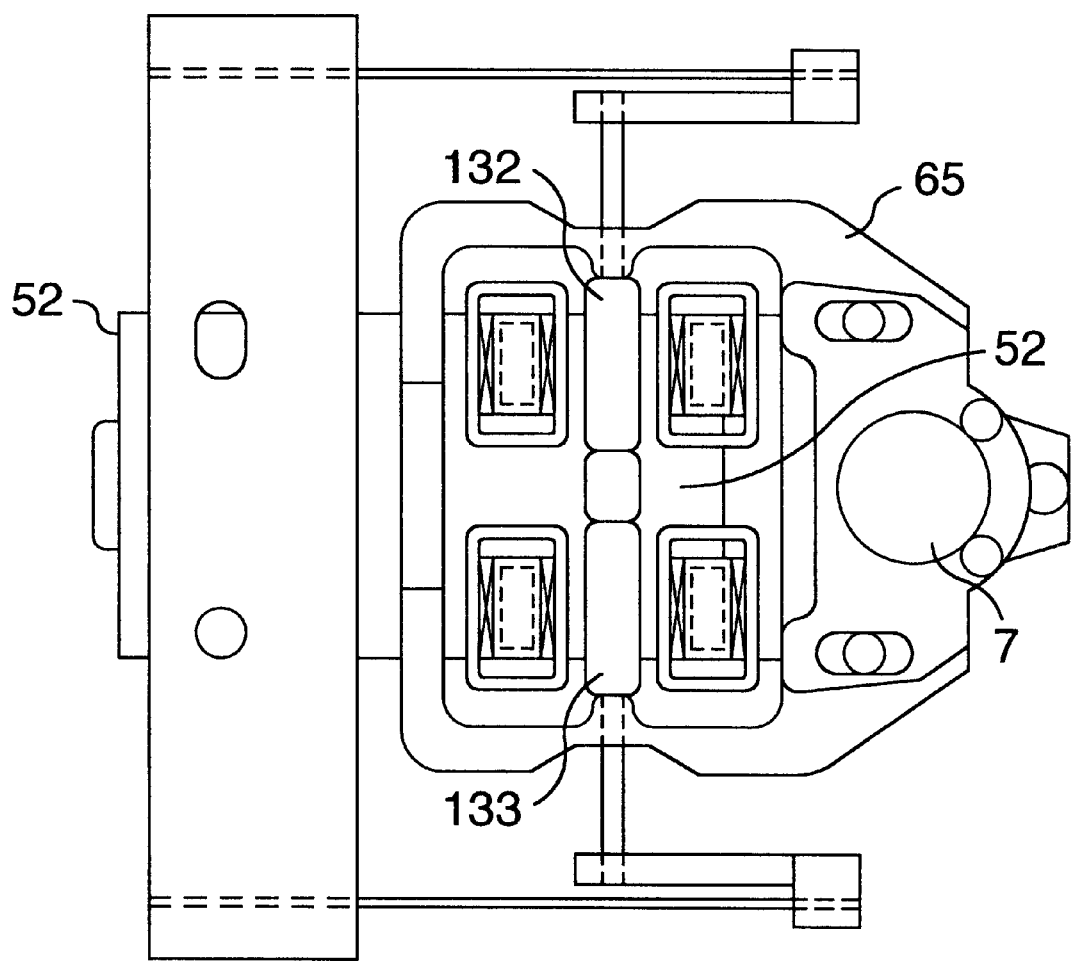
FIG. 20 is a plan view of a further actuator nit in FIG. 12.

A further construction for reducing the weight of the actuator unit is explained in the following. FIG. 20 is a plan view of the further actuator unit in FIG. 12. Where the actuator of FIG. 20 differs from that of FIG. 18 is that the magnet is divided into two and the two magnets are placed at the center of the almost rectangular opening portion. That is, an objective lens holding cylinder 65 is formed in a frame type structure having a circular space portion and an almost rectangular opening portion. A first magnet 132 and a second magnet 133 are disposed at the center of the almost rectangular opening portion in the radial direction and fixed by adhesive or the like. These two magnets 132, 133 are shaped like flat plates and magnetized such that they have an N pole on the side of the objective lens 7 and an S pole on the other side (or opposite side).

Other portions than those described above, including the tracking coils, focus coils and wires 49, are all identical with those of FIGS. 13 and 18. Thus, the tracking operation, the focusing operation and the tilt operation are also similar to those described in connection with FIG. 13. However, where the construction of this example differs from that of FIG. 18 is that the first magnet 132 and the second magnet 133 are placed near the cores 62 and the central area remote from the cores 62 is made simply a space. Thus the magnets, since they are divided, become smaller in size and the overall volume of the magnets also becomes smaller, which in turn reduces the mass of the movable portion to that extent. Further, because the areas near the cores 62 have concentrated fluxes and relatively high flux densities and because the fist to fourth magnets 121–124 are installed in such areas, the driving force induced by attraction and repulsion becomes stronger. Combined with the reduction in mass, the increased driving force can improve the operation sensitivity of the actuator unit 10.

General Effect

As explained in the above examples, including the moving coil type according to the embodiment 1 and the moving magnet type according to the embodiment 2, the present invention can provide an optical pickup apparatus capable of performing the tilt control in the radial and tangential directions. Therefore, because radial and tangential skews that may be caused by, for example, a warped surface of the optical disk can be corrected, it is possible to perform an optimum tilt control for reading a signal and increase the skew margin, thereby assuring reliable reproducing and recording even for high-density optical disks and low-precision optical disks. It is also possible to realize a small and thin optical pickup apparatus that optimumly arranges a tilt control mechanism to improve space utilization. The use of this optical pickup apparatus can provide significant advantages, such as reduction in the size and thickness of the optical disk apparatus.

What is claimed is:

1. An optical pickup apparatus comprising:

an objective lens for focusing a beam emitted from a light source onto an optical disk;

a lens holding means for holding said objective lens;

a plurality of elastic supporting means for elastically supporting said lens holding means so that it can be moved; and a support base means for fixedly supporting said elastic supporting means and for fixedly supporting a drive means, said drive means being adapted to movably drive said lens holding means;

wherein said lens holding means has a circular space portion and an almost rectangular opening portion in which said drive means is inserted, said circular space portion being adapted to hold said objective lens and guide said beam emitted from said light source to said objective lens;

wherein said elastic supporting means has a first elastic supporting means having one end thereof secured to said support base means and a second supporting means having one end thereof secured to an almost central part, with respect to a tangential direction, of said almost rectangular opening portion of said lens holding means;

wherein said lens holding means is supported so that it can be pivoted in said tangential direction about said second elastic supporting means as a rotating center.

2. An optical pickup apparatus according to claim 1, wherein said lens holding means has said circular space portion and said almost rectangular opening portion arranged on opposite sides of said objective lens, and a light path for guiding said beam emitted from said light source exists in said circular space portion.

3. An optical pickup apparatus comprising:

an objective lens for focusing a beam emitted from a light source onto an optical disk;

a lens holding means for holding said objective lens;

a plurality of elastic supporting means for elastically supporting said lens holding means so that it can be moved; and a support base means for fixedly supporting said elastic supporting means and for fixedly supporting a drive means, said drive means being adapted to movably drive said lens holding means;

wherein said lens holding means has a circular space portion and an almost rectangular opening portion in which said drive means is inserted, said circular space portion being adapted to hold said objective lens and accommodate a light path for guiding said beam emitted from said light source to said objective lens, and said circular space portion and said almost rectangular opening portion are arranged on opposite sides of said objective lens;

wherein said elastic supporting means has a first elastic supporting means having one end thereof secured to said support base means and a second supporting means having one end thereof secured to an almost central part, with respect to a tangential direction, of said almost rectangular opening portion of said lens holding means;

wherein said lens holding means is supported so that it can be pivoted in said tangential direction about said second elastic supporting means as a rotating center.

4. An optical pickup apparatus according to claim 3, wherein said drive means includes four focusing drive means capable of generating drive forces in a focusing direction independently of each other, and said lens holding means can be pivoted in a tangential direction about said second elastic supporting means as a center axis by controlling said magnitude and direction of said drive forces generated by said focusing drive means independently of each other.

5. An optical pickup apparatus according to claim 3, wherein said drive means includes four focusing drive means capable of generating drive forces in a focusing direction independently of each other, and said lens holding means can be pivoted in a radial direction about a pivot axis extending in a tangential direction by controlling said magnitude and direction of said drive forces generated by said focusing drive means independently of each other.

6. An optical pickup apparatus according to claim 3, wherein said lens holding means accommodates in said almost rectangular opening portion said drive means including said four focusing drive means capable of generating drive forces in a focusing direction independently of each other, and optical constitutional elements associated with said light path and constitutional elements associated with said drive means are arranged on said same plane on opposite sides of said objective lens.

7. An optical pickup apparatus comprising:
an objective lens for focusing a beam emitted from a light source onto an optical disk;
a lens holding means for holding said objective lens;
a plurality of elastic supporting means for elastically supporting said lens holding means so that it can be moved; and
a support base means for fixedly supporting said elastic supporting means and for fixedly supporting a drive means, said drive means being adapted to movably drive said lens holding means;
wherein said lens holding means has a circular space portion and an almost rectangular opening portion in which said drive means is inserted, said circular space portion being adapted to hold said objective lens and accommodate a light path for guiding said beam emitted from said light source to said objective lens, and said circular space portion and said almost rectangular opening portion are arranged on opposite sides of said objective lens;
wherein four annular coils wound in a plane parallel to a disk surface are respectively provided in four nearly equally divided parts of said almost rectangular opening portion, said drive means has four magnetic pole pieces erected on said support base means and permanent magnets secured to each of said magnetic pole pieces and magnetized in a radial direction of said disk, and when said drive means is inserted in said almost rectangular opening portion, said magnetic pole pieces and said permanent magnets are inserted into each of said four annular coils;
wherein said elastic supporting means has a first elastic supporting means having one end thereof secured to said support base means and a second supporting means having one end thereof secured to an almost central part, with respect to a tangential direction, of said almost rectangular opening portion of said lens holding means;
wherein said lens holding means is supported so that it can be pivoted in said tangential direction about said second elastic supporting means as a rotating center.

8. An optical pickup apparatus according to claim 7, wherein said first elastic supporting means and said second elastic supporting means each comprise a plurality of conductive wire-like elastic members insulated from one another by insulating elastic members.

9. An optical pickup apparatus according to claim 8, wherein said insulating elastic members are formed of silicone rubber.

10. An optical pickup apparatus according to claim 7, wherein said almost rectangular opening portion has a second annular coil wound in a plane perpendicular to said disk surface, and said second annular coil is arranged in a tangential direction at almost a central part, with respect to a tangential direction, of said almost rectangular opening portion.

11. An optical pickup apparatus comprising:
an objective lens for focusing a beam emitted from a light source onto an optical disk;
a lens holding means for holding said objective lens;
a plurality of elastic supporting means for elastically supporting said lens holding means so that it can be moved; and
a support base means for fixedly supporting said elastic supporting means and for fixedly supporting a drive means, said drive means being adapted to movably drive said lens holding means;
wherein said lens holding means has a circular space portion and an almost rectangular opening portion in which said drive means is inserted, said circular space portion being adapted to hold said objective lens and accommodate a light path for guiding said beam emitted from said light source to said objective lens, and said circular space portion and said almost rectangular opening portion are arranged on opposite sides of said objective lens;
wherein said almost rectangular opening portion has permanent magnets magnetized in a radial direction of said disk, said drive means has a plurality of coil means arranged on said support base means, and when said drive means is inserted into said almost rectangular opening portion, said coil means are opposed to said permanent magnets;
wherein said elastic supporting means has a first elastic supporting means having one end thereof secured to said support base means and a second supporting means having one end thereof secured to an almost central part, with respect to a tangential direction, of said almost rectangular opening portion of said lens holding means;
wherein said lens holding means is supported so that it can be pivoted in said tangential direction about said second elastic supporting means as a rotating center.

12. An optical pickup apparatus according to claim 11, wherein said first elastic supporting means and said second elastic supporting means each comprise a plurality of conductive wire-like elastic members having insulating elastic members interposed therebetween.

13. An optical pickup apparatus according to claim 12, wherein said insulating elastic members are formed of silicone rubber.

14. An optical pickup apparatus according to claim 11, wherein said coil means have tracking coils wound around core members made of ferromagnetic material in a plane perpendicular to said disk surface and focus coils wound in a plane parallel to said disk surface.

15. An optical pickup apparatus according to claim 11, wherein said permanent magnets are shaped like parallel flat plates and are arranged in a radial direction at a side of said almost rectangular opening portion close to said objective lens and at a side remote from said objective lens.

16. An optical pickup apparatus according to claim 11, wherein said permanent magnets are shaped like parallel flat plates and are arranged in a radial direction at a nearly central part, with respect to a tangential direction, of said almost rectangular opening portion.

17. An optical pickup apparatus according to claim 11, wherein said permanent magnets are shaped like parallel flat plates, are arranged in a radial direction at a side of said almost rectangular opening portion close to said objective lens and at a side remote from said objective lens, and are divided by and arranged symmetric with respect to an axis extending in said tangential direction through said center of said objective lens.

18. An optical pickup apparatus according to claim 11, wherein said permanent magnets are shaped like parallel flat plates, are arranged in a radial direction at a nearly central part, with respect to a tangential direction, of said almost rectangular opening portion, and are divided by and arranged symmetric with respect to an axis extending in said tangential direction through said center of said objective lens.

19. An optical pickup apparatus according to claim 1, wherein when an optical disk is loaded, a thickness from said underside of said optical disk to said underside of said of said optical disk apparatus is set to 7.6 mm or less.

20. An optical pickup apparatus using said optical pickup apparatus of claim 7 and having an overall thickness of 12.7 mm or less.

21. An optical pickup apparatus using said optical pickup apparatus of claim 11 and having an overall thickness of 12.7 mm or less.

22. An optical pickup apparatus according to claim 3, wherein when an optical disk is loaded, a thickness from said underside of said optical disk to said underside of said optical disk apparatus is set to 7.6 mm or less.

23. An optical pickup apparatus according to claim 7, wherein when an optical disk is loaded, a thickness from said underside of said optical disk to said underside of said optical disk apparatus is set to 7.6 mm or less.

24. An optical pickup apparatus according to claim 11, wherein when an optical disk is loaded, a thickness from said underside of said optical disk to said underside of said optical disk apparatus is set to 7.6 mm or less.

25. An optical pickup apparatus using said optical pickup apparatus claimed in claim 1.

26. An optical pickup apparatus using said optical pickup apparatus claimed in claim 3.

27. An optical pickup apparatus using said optical pickup apparatus claimed in claim 7.

28. An optical pickup apparatus using said optical pickup apparatus claimed in claim 11.

29. An optical pickup apparatus using said optical pickup apparatus of claim 1 and having an overall thickness of 12.7 mm or less.

30. An optical pickup apparatus using said optical pickup apparatus of claim 3 and having an overall thickness of 12.7 mm or less.

* * * * *